(12) United States Patent
Guillet et al.

(10) Patent No.: US 9,728,339 B2
(45) Date of Patent: Aug. 8, 2017

(54) INSULATION FOR HIGH VOLTAGE CAPACITORS

(71) Applicant: Maxwell Technologies, Inc., San Diego, CA (US)

(72) Inventors: Dominique Guillet, Orsonnens (CH); Etienne Savary, Farvagny (CH); Joseph Bulliard, Villarsel-le-Gibloux (CH); Patrick Gaillard, Bulle (CH)

(73) Assignee: Mexwell Technologies, Inc., San Diego, CA (US)

( * ) Notice: Subject to any disclaimer, the term of this patent is extended or adjusted under 35 U.S.C. 154(b) by 99 days.

(21) Appl. No.: 14/644,015

(22) Filed: Mar. 10, 2015

(65) Prior Publication Data

US 2015/0262755 A1    Sep. 17, 2015

Related U.S. Application Data

(60) Provisional application No. 61/951,409, filed on Mar. 11, 2014.

(51) Int. Cl.
| | |
|---|---|
| *H01G 4/38* | (2006.01) |
| *H01B 3/30* | (2006.01) |
| *H01G 11/10* | (2013.01) |
| *H01G 11/76* | (2013.01) |
| *H01G 4/228* | (2006.01) |

(Continued)

(52) U.S. Cl.
CPC .......... *H01G 4/38* (2013.01); *H01B 3/30* (2013.01); *H01G 4/228* (2013.01); *H01G 11/10* (2013.01); *H01G 11/76* (2013.01); *H01B 3/441* (2013.01); *H01G 4/232* (2013.01); *Y02E 60/13* (2013.01); *Y10T 29/43* (2015.01)

(58) Field of Classification Search
CPC .................................. H01G 4/32; H01G 4/38
USPC ................................................... 361/328–329
See application file for complete search history.

(56) References Cited

U.S. PATENT DOCUMENTS

| | | | | |
|---|---|---|---|---|
| 2,231,701 A | * | 2/1941 | Brooks ..................... | H01G 4/38 |
| | | | | 361/275.1 |
| 2,777,976 A | * | 1/1957 | Brafman .................. | H01G 4/30 |
| | | | | 174/521 |
| 4,744,000 A | | 5/1988 | Mason et al. | |

(Continued)

FOREIGN PATENT DOCUMENTS

| | | |
|---|---|---|
| JP | 2002-110480 | 4/2002 |
| JP | 2004-164905 | 6/2004 |

OTHER PUBLICATIONS

Dewitte, Gordon. "Wobble Wedges Toolmonger", Sep. 16, 2009, Retrieved from the Internet: http://toolmonger.com/2009/09/16/wobble-wedges/, on Jun. 2, 2015.

*Primary Examiner* — Eric Thomas
(74) *Attorney, Agent, or Firm* — Knobbe Martens Olson & Bear LLP

(57) ABSTRACT

Methods and apparatus are provided for a high voltage capacitor having a plurality of capacitor units connected in electrical series in a stacked configuration. An insulator element can be positioned between two adjacent capacitor units of the high voltage capacitor for providing separation between the adjacent capacitor units, where the insulator element has a first thickness at a first end of the insulator element and a second smaller thickness at a second end of the insulator element. The insulator element can have a wedge-shaped cross section.

23 Claims, 15 Drawing Sheets

(51) Int. Cl.
   *H01G 4/232*      (2006.01)
   *H01B 3/44*       (2006.01)

(56) References Cited

U.S. PATENT DOCUMENTS

| | | |
|---|---|---|
| 5,359,487 A    | 10/1994  | Carrico et al. |
| 6,310,756 B1   | 10/2001  | Miura et al. |
| 6,585,917 B2   | 7/2003   | Sletson et al. |
| 6,807,046 B2   | 10/2004  | Reiner et al. |
| 7,170,738 B2   | 1/2007   | Scheidegger et al. |
| 7,325,285 B2   | 2/2008   | Bulliard et al. |
| 7,483,257 B2   | 1/2009   | Scheidegger et al. |
| 7,489,496 B2   | 2/2009   | Scheidegger et al. |
| 8,110,011 B2   | 2/2012   | Bulliard et al. |
| 8,159,812 B2   | 4/2012   | Eriksson |
| 8,274,778 B2   | 9/2012   | Yoshinaga et al. |
| 2003/0133255 A1 | 7/2003  | Reiner et al. |
| 2003/0142457 A1 | 7/2003  | Eriksson et al. |
| 2005/0264978 A1 | 12/2005 | Scheidegger et al. |
| 2008/0092355 A1 | 4/2008  | Bulliard et al. |
| 2008/0092380 A1 | 4/2008  | Bulliard et al. |

* cited by examiner

INSULATION FOR HIGH VOLTAGE CAPACITORS

REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND

Field

The present invention relates generally to electrical energy storage devices, and more specifically, to the design of the energy storage device insulation material.

Description of the Related Art

High voltage capacitors can be used in various applications, including in the transmission, distribution and measurement of electrical energy. For example, high voltage capacitors may be used in transmission, distribution and measurement of electrical energy in a power transmission grid. High voltage capacitors typically can have a large size (e.g., several meters in length) and can be heavy (e.g., weight of about 50 kilograms (kg)). A size (e.g., a volume) and/or weight of a high voltage capacitor can depend on dimensions of the active components of the high voltage capacitor, which in turn can depend on desired electrical specification of the high voltage capacitor. Selection of a suitable high voltage capacitor can depend on various factors, including for example, desired electrical performance, reliability, and ease of manufacturing and/or cost of operation.

SUMMARY

One embodiment includes a high voltage capacitor. The high voltage capacitor may include a plurality of capacitor units connected in electrical series in a stacked configuration, the plurality of capacitor units comprising at least two adjacent capacitor units. An insulator element may be positioned between and separating the two adjacent capacitor units. The insulator element may have a first end and a second opposing end, and the first end may have a first thickness and the second opposing end may have a second smaller thickness.

In some embodiments, the insulator element can have a thickness along a dimension from the first end to the second opposing end which decreases linearly from the first end to the second end. In some embodiments, a thickness of the insulator element along a dimension perpendicular to the dimension from the first end to the second end can remain substantially constant.

In some embodiments, a cross section of the insulator element along a dimension extending from the first end to the second opposing end can have a triangle shape.

In some embodiments, the second end can be proximate to a connection portion between the two adjacent capacitor units, the connection portion connecting the two adjacent capacitor units in electrical series. In some embodiments, the thickness of the first end of the insulator element can be about 1 mm to about 3 mm, and wherein the thickness of the second end can be less than about 0.01 mm. The insulator element may include polypropylene.

In some embodiments, the insulator element can include a first insulator element between a first set of two adjacent capacitor units, and the high voltage capacitor can include a second insulator element between a second set of two adjacent capacitor units. The second insulator element may have a first end and a second opposing end, and where the first end of the second insulator element can have a first thickness and the second opposing end of the second insulator element can have a second smaller thickness. The first and the second insulator elements may be positioned in an alternating configuration with respect to each other.

In some embodiments, at least one of the adjacent capacitor units can include a plurality of individual capacitor cells in electrical parallel.

In some embodiments, the high voltage capacitor can be configured for providing a nominal operating voltage of about 1 kilovolts (kV) to about 600 kV. In some embodiments, the plurality of capacitor units can include about 1 to about 1,000 capacitor units.

One embodiment includes an insulator element. The insulator element may include a first end having a first thickness and an opposing second end having a second thinner thickness, where the insulator element is configured for placement between two adjacent capacitor units of a high voltage capacitor, and where the adjacent capacitor units are in electrical series.

In some embodiments, the insulator element has a thickness along a dimension from the first end to the second opposing end which decreases substantially linearly from the first end to the second end. In some embodiments, a thickness of the insulator element along a dimension perpendicular to the dimension from the first end to the second opposing end remains substantially constant.

In some embodiments, a cross section of the insulator element along a dimension from the first end to the second opposing end can have a triangle shape.

In some embodiments, the first end can be proximate to a connection portion between the two adjacent capacitor units, the connection portion connecting the two adjacent capacitor units in electrical series. In some embodiments, the first end can have a thickness of about 1 mm to about 3 mm.

Another embodiment can include a high voltage capacitor which includes a plurality of insulator elements having a first end and an opposing second end, the first end having a first thickness and the opposing second end having a second thinner thickness. The insulator element may be configured for placement between two adjacent capacitor units of the high voltage capacitor, where the adjacent capacitor units are in electrical series. The insulator element may have a thickness along a dimension from the first end to the second opposing end which decreases substantially linearly from the first end to the second end. The high voltage capacitor may be configured for providing a nominal operating voltage of about 10 kilovolts (kV) to about 420 kV.

In one embodiment, a method of fabricating a high voltage capacitor can include providing a first capacitor unit, and providing a second capacitor unit over the first capacitor unit, where the second capacitor unit is coupled in electrical series with the first capacitor unit at a first edge of the first capacitor unit and a corresponding first edge of the second capacitor unit. The method may also include providing a third capacitor unit over the second capacitor unit, where the second capacitor unit is coupled in electrical series with the second capacitor unit at a second opposing edge of the second capacitor unit and a first edge of the third capacitor unit. A first wedge-shaped insulator element may be inserted between the first capacitor unit and the second capacitor unit, where the first wedge-shaped insulator element can have a first thinner edge and a second opposing thicker edge, and where the thinner edge can be positioned proximate to the electrical coupling between the first and second capacitor units. A second wedge-shaped insulator element may be between the second capacitor unit and the third capacitor unit, where the second wedge-shaped insulator element can have a first thinner edge and a second opposing thicker edge. The second wedge-shaped insulator element may be positioned between the second capacitor unit and the third capacitor unit in an orientation opposite that of the first wedge-shaped insulator element.

In some embodiments, at least one of inserting the first wedge-shaped insulator element and inserting the second wedge-shaped insulator element can include inserting an insulator element having a cross-section having a triangle shape.

In some embodiments, at least one of providing the first capacitor unit, providing the second capacitor unit, and providing the third capacitor unit can include providing a plurality of individual capacitor cells in electrical parallel.

In some embodiments, providing a plurality of individual capacitor cells in electrical parallel can include providing the plurality of individual capacitor cells in a stacked configuration.

In some embodiments, the first capacitor unit and the second capacitor unit may be coupled to one another using a first conductive tab, and the second capacitor unit and the third capacitor unit may be coupled to one another using a second conductive tab.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

Various features, aspects, and advantages of the present disclosure are described with reference to the drawings of certain embodiments, which are intended to illustrate certain embodiments and not to limit the disclosure. The drawings are not necessarily to scale.

DETAILED DESCRIPTION

Figure 1:
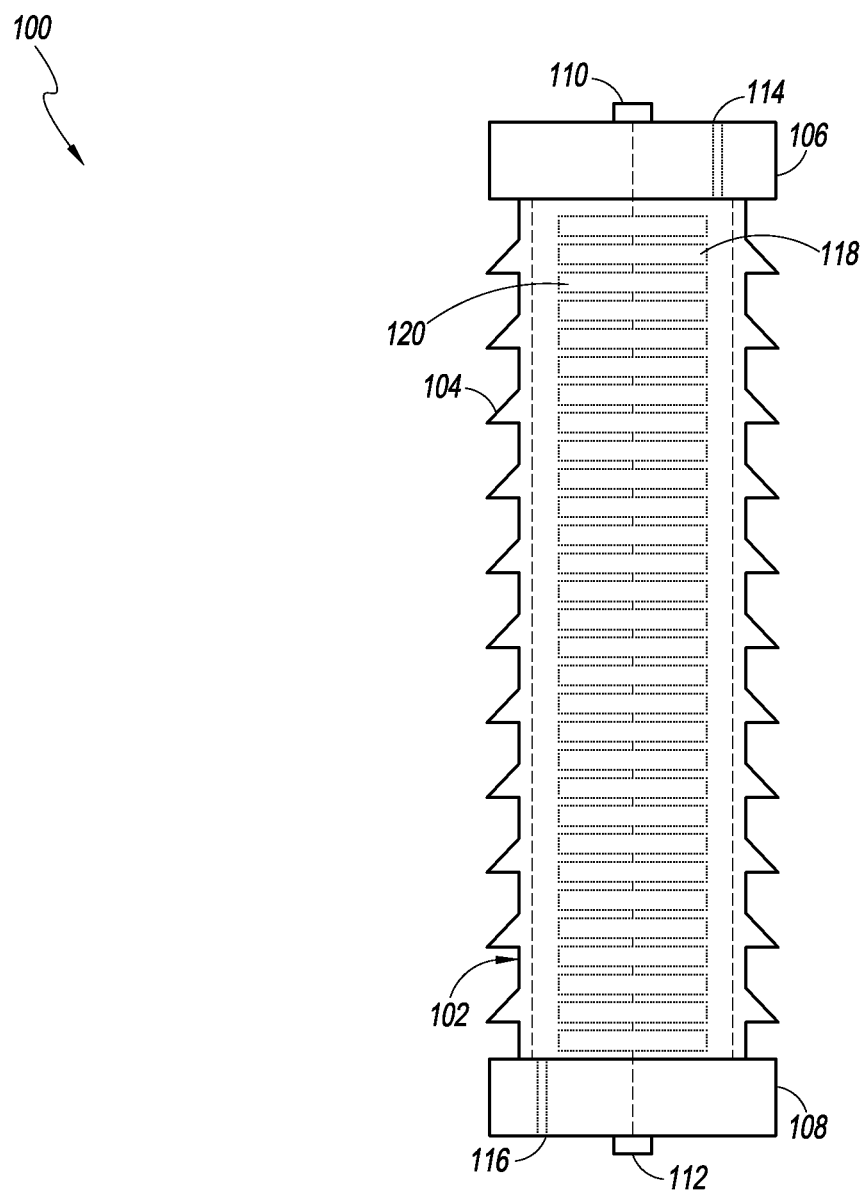
FIG. 1 shows a cross-sectional side view of an example of a high voltage capacitor including a plurality of capacitor cells coupled in electrical series.

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

A high voltage capacitor may comprise a plurality of individual capacitor cells. For example, the plurality of capacitor cells may be in electrical series. The plurality of individual capacitor cells may be in a stacked configuration, each capacitor cell aligned with and placed over and/or below another capacitor cell. One or more insulator elements may be inserted between adjacent capacitor cells that are connected in electrical series to provide physical and/or electrical separation between the adjacent capacitor cells.

Cost of operating and/or manufacturing a high voltage capacitor can depend on the size and/or weight of the high voltage capacitor. For example, larger and/or heavier high voltage capacitors generally have higher costs of operation and manufacturing. Feasibility for use in various applications can depend on a size and/or weight of the high voltage capacitor. Providing a high voltage capacitor having a reduced volume and/or weight may facilitate a reduction in operation and/or manufacturing costs of the high voltage capacitor. High voltage capacitors having a reduced volume and/or weight may also facilitate its use in additional applications.

One embodiment of the invention is a high voltage capacitor having a plurality of capacitor cells connected in electrical series within a housing where the capacitor cells are positioned one over the next such that the capacitor cells have a stacked configuration. Within the capacitor cells are a plurality of insulator elements disposed between adjacent capacitor cells connected in electrical series to provide a desired separation between the adjacent capacitor cells. The insulator element can be positioned between adjacent capacitor cells such that a first end of the insulator element is proximate to a connection portion at which the adjacent capacitor cells connect to one another, and a second opposing end of the insulator element is proximate to respective ends of the adjacent capacitor cells which are not connected to one another. The insulator element may have a thickness at its second end which is thicker than a thickness at its first end so that the insulator element is wedge-shaped. For example, the wedge-shaped insulator element may have a triangle or substantially triangle shape, or a trapezoid or substantially trapezoid shape, or other wedge shapes that generally decrease in thickness, linearly or non-linearly, from a side cross-sectional view along an axis extending between the first end and second opposing end of the insulator element. In some embodiments, using a plurality of the wedge-shaped insulator elements in a stacked configuration may facilitate up to about a 30% reduction in volume of the high voltage capacitor, for example as compared to a high voltage capacitor of similar performance which included insulator elements which had equal or substantially equal thicknesses at the first end and the second opposing end, and uniform thickness across its length between the two opposing ends.

In some embodiments, the thickness of the insulator element may decrease linearly or substantially linearly from the second to the first end. For example, the insulator element may have a trapezoid or substantially trapezoid shape, from a first side cross-sectional view. In some embodiments, the insulator element can have a triangular or substantially triangular shape, from a first side cross-sectional view. In some embodiments, the insulator element can have a constant or substantially constant thickness along a second cross sectional view perpendicular to the first cross-sectional view, for example, along an axis extending from the first end to the second end.

It will be understood that an insulator element having a triangle shape as used herein can include an insulator element comprising two adjacent sides which meet at a point or substantially at a point, for example as much at a point as would be possible using suitable manufacturing techniques. For example, an insulator element having a triangle shape as used herein may have a thickness at a point at which two adjacent sides meet as would be expected based on manufacturing tolerances of suitable manufacturing techniques. For example, a thickness of the point at which two adjacent sides of a triangle shaped insulator element meet can be about 0.01 millimeters (mm) or less, including about 0.002 mm or less. Embodiments of an insulator element with two adjacent sides of greater thickness may form another shape, such as an approximate trapezoidal shape as described further herein.

Various materials may be suitable for the insulator element, including for example a polymeric material comprising polypropylene. In some embodiments, an insulator element may include a plurality of tabs protruding from one or more edges of the insulator element configured to facilitate stabilizing the capacitor cells within the high voltage capacitor housing, such as a tab at each corner of an insulator element having a rectangular or substantially rectangular shape.

FIG. 1 shows a cross-sectional schematic view of an example of a high voltage capacitor 100. The high voltage capacitor 100 can include a plurality of capacitor units. Each capacitor unit can include a single, individual capacitor cell, or a plurality of capacitor cells. For example, the high voltage capacitor 100 can include a capacitor cell 120 and a capacitor cell 118 (e.g., winding elements), within a housing 102. Additional embodiments of capacitor units formed from single individual cells are described further below, for example, with reference to FIGS. 3A and 3B. Additional embodiments of capacitor units, with each unit formed from a plurality of individual cells connected in parallel, are described further below, for example, with reference to FIG. 3C.

The capacitor cells 118, 120 can be connected in series, such that each capacitor cell forms a corresponding individual capacitor unit. The capacitor cells 118, 120 can be connected in parallel, with or without additional cells, to form, in combination, an individual capacitor unit.

In some embodiments, the housing 102 may comprise an electrically insulating material. In some embodiments, the high voltage capacitor 100 can be placed within a second housing, such as a second insulating housing. For example, a plurality of the high voltage capacitors 100 may be placed within a second insulating housing to form a part of a larger capacitor.

The high voltage capacitor housing 102 may include a first end cap on a first end portion 106 of the housing 102 and a second end cap on a second opposing distal end portion 108 of the housing 102, the end caps being configured to facilitate sealing of the housing 102. A first electrical access terminal 110 can be positioned on the first distal end portion 108 (e.g., on the first end cap) and a second electrical access terminal 112 can be positioned on the second opposing distal end portion 108 (e.g., on the second end cap 108) for facilitating electrical coupling between the plurality of capacitor cells within the housing with an external circuit. The high voltage capacitor housing 102 may include one or more resealable ports in the first distal end portion 106 and/or the second distal end portion 108 (e.g., resealable port 114 on the first end cap, resealable port 116 on the second end cap) for facilitating passing a fluid (e.g., a liquid and/or a gas) between an interior of the high voltage capacitor housing 102 and a reservoir exterior to the high voltage capacitor housing 102. For example, an impregnation fluid may be passed through the one or more resealable ports. Impregnation fluids may include a liquid and/or a gas. In some embodiments, a suitable impregnation liquid can be oil based. In some embodiments, a suitable impregnation liquid can include a gas comprising sulfur hexafluoride ($SF_6$) and/or air (e.g., dry air, such as air having a water vapor content of less than about 10 parts per million (ppm)). In some embodiments, the high voltage capacitor housing 102 can include more than one resealable ports in an end cap, and/or include resealable ports in only one of the first end cap or the second end cap.

In some embodiments, as shown in FIG. 1, a high voltage capacitor housing 102 can include a plurality of extensions 104 along a dimension (e.g., a length or height) of the housing 102. For example, the extensions 104 may be regularly or intermittently spaced along the dimension. In some embodiments, the extensions 104 may facilitate cooling of the high voltage capacitor 100 during its operation, and/or provide a geometry and/or material to which impurities have difficulty adhering to. The extensions 104 can be any suitable shape to provide such functionality, such as ribs or fins.

In some embodiments, the high voltage capacitor housing 102 can have a geometry, such as a geometry which includes the extensions 104, to increase a creepage length between conductive components on the high voltage capacitor housing 102. For example, a high voltage capacitor housing 102 having the extensions 104 may provide a desired creepage distance between conductive components on the high voltage capacitor housing 102, such as a desired separation distance along a path on a surface of the high voltage capacitor housing 102. Inadequate creepage distance between conductive components on a high voltage capacitor housing may contribute to undesired formation of one or more conductive paths along a surface of a housing therebetween, for example due to electrical discharge proximate to and/or on the housing. A high voltage capacitor housing providing desired creepage distance between conductive components on the high voltage capacitor housing may reduce or eliminate generation of the electrically conductive paths on the housing, facilitating an increase in a reliability of the high voltage capacitor. In some embodiments, the extensions 104 may be shaped and/or dimensioned to provide desired creepage distance between metal-containing components at a first distal portion 106 and at a second distal portion 108 of the housing 102. For example, the extensions 104 may be configured to provide a desired creepage distance between a first end cap at the first distal portion 106 and a second end cap at the second distal portion 108 of the housing 102, and/or a desired creepage distance between a first electrical access terminal 110 at the first distal portion 106 and a second electrical access terminal 112 at the second distal portion 108 of the housing 102.

As described herein, in some embodiments, the high voltage capacitor 100 may include a plurality of capacitor cells connected in electrical series. In some embodiments, adjacent capacitor cells, such as capacitor cell 118 and capacitor cell 120 shown in FIG. 1, can be connected in electrical series with one another, the capacitor cell 118 being positioned over the capacitor cell 120 such that the two adjacent capacitor cells form a stacked configuration. In some embodiments, a first end of the capacitor cell 118 can be coupled to a corresponding end of the capacitor cell 120 to connect the capacitor cells in electrical series, and the capacitor cell 118 can be folded over the capacitor cell 120 such that the two adjacent capacitor cells form the stacked configuration. An embodiment of such folded adjacent capacitor cells is described further below with respect to FIG. 2.

A number of capacitor cells in electrical series in a high voltage capacitor 100 can depend on a desired nominal operating voltage of the high voltage capacitor 100. A single capacitor cell (e.g., capacitor cell 118 or capacitor cell 120) can have a nominal cell capacitance of about 20 nanofarads (nF) to about 10 microfarads (μF). Other capacitor cell capacitance values may also be suitable. A plurality of capacitor cells can be connected in series to provide a high voltage capacitor having a nominal operating voltage of about 1 kilovolts (kV) to about 600 kV, including about 10 kV to about 420 kV. Of course other nominal operating voltages for a high voltage capacitor, or other stacked capacitors of lower voltage may also be suitable.

In some embodiments, a high voltage capacitor can include about 1 to about 1000 capacitor units, including about 10 to about 800, about 10 to about 600, about 10 to about 400, about 10 to about 200, or about 10 to about 100 capacitor units. In some embodiments, a capacitor unit may comprise a plurality of individual capacitor cells in electrical parallel. For example, a high voltage capacitor can include about 10 to about 50 capacitor units, at least one of the capacitor units having a plurality of individual capacitor cells in electrical parallel. In some embodiments, a capacitor unit may comprise a single individual capacitor cell. For example, a high voltage capacitor can include about 1 to about 1000 individual capacitor cells, including about 10 to about 800, about 10 to about 600, about 10 to about 400, about 10 to about 200, or about 10 to about 100 individual capacitor cells.

In some embodiments, one or more high voltage capacitors described herein may be configured for monitoring, communication and/or voltage measurement functions in power grid, transportation, and/or other industrial applications. In some embodiments, one or more high voltage capacitors described herein may comprise a coupling capacitor configured for coupling high frequency power line carrier (PLC) signals on a power transmission line, such as for coupling high frequency power line carrier transmission frequency range from about 30 kHz to about 500 kHz. In some embodiments, one or more high voltage capacitors described herein may comprise a partial discharge coupling capacitor. In some embodiments, one or more high voltage capacitors described herein can be configured for measurement of voltage on high-voltage power lines.

Figure 2:
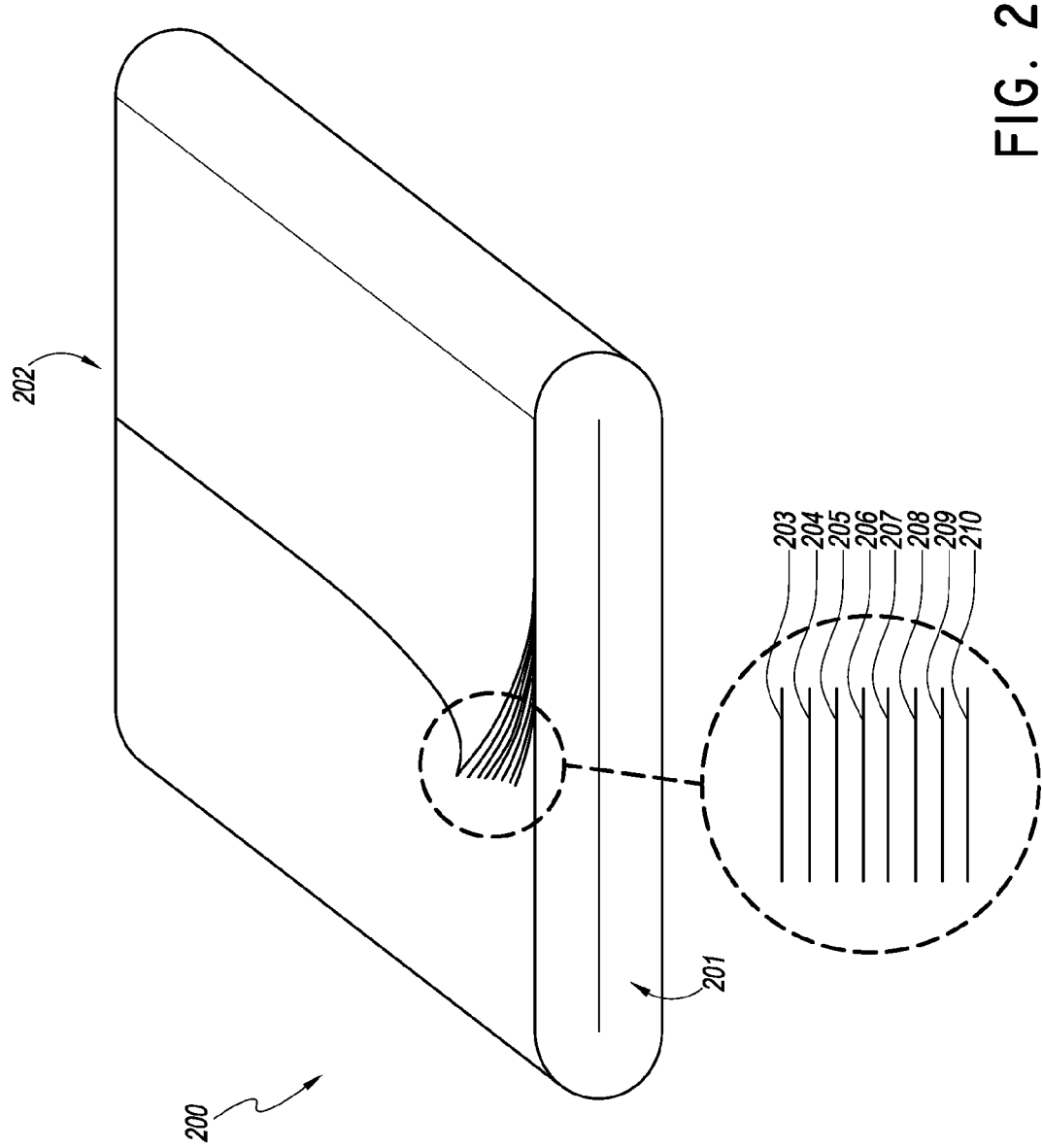
FIG. 2 shows a perspective view of an example of a capacitor cell of a high voltage capacitor.

FIG. 2 shows a perspective view of an example of a single capacitor cell 200 having a first end 201 and an opposing second end 202. For example, the capacitor cell 200 may be a part of the capacitor 100 of FIG. 1, such as capacitor cell 118, capacitor cell 120, or other cells of FIG. 1. The capacitor cell 200 can include a plurality of material layers (e.g., material layers 203, 204, 205, 206, 207, 208, 209, 210 as shown in FIG. 2) which are rolled and/or folded. In some embodiments, the plurality of material layers can be aligned and positioned one over the next such that the material layers can be rolled and/or folded to form the capacitor cell 200 having the first end 201 and the second end 202. In some embodiments, each of the plurality of material layers can have a rectangular or substantially rectangular shape. In some embodiments, the plurality of material layers can have the same or substantially the same width and/or length. For example, a plurality of rectangular or substantially rectangular material layers having same or similar dimensions can be aligned and positioned one over the next such that the material layers can be rolled and/or folded to form the capacitor cell 200 having the first end 201 and the second end 202. In some embodiments, respective opposing edges of the rolled and/or folded plurality of material layers can form the first end 201 and the second opposing end 202 of the capacitor cell 200. In some embodiments, the capacitor cell 200 can be electrically connected to one or more adjacent capacitor cells using the first end 201 and/or the second opposing end 202.

The plurality of material layers of the capacitor cell 200 can include one or more electrically insulating layers (e.g., insulator layers) and one or more electrically conductive layers. For example, the capacitor cell 200 can include electrically conductive layers 206, 210, and insulator layers 203, 204, 205, 207, 208, 209. In some embodiments, as shown in FIG. 2, the plurality of material layers can be arranged as follows: insulator layer 203 as the outermost layer, followed by insulator layer 204 positioned along an inner surface of insulator layer 203, insulator layer 205 positioned along an inner surface of insulator layer 204, electrically conductive layer 206 positioned along an inner surface of insulator layer 205, insulator layer 207 positioned along an inner surface of electrically conductive layer 206, insulator layer 208 positioned along an inner surface of insulator layer 206, insulator layer 209 positioned along an inner surface of insulator layer 208, and electrically conductive layer 210 positioned along an inner surface of insulator layer 209. In some embodiments, the plurality of material layers may be arranged in an order different from that described herein, or may include more or less quantities of layer(s).

In some embodiments, one or more of the electrically conductive layers 206, 210 can be made of two or more parallel or substantially parallel electrically conductive material bands. For example, layers 206, 210 can comprise two or more parallel or substantially parallel electrically conductive material bands. In some embodiments, electrically conductive material bands of an electrically conductive layer are electrically insulated from one another. For example, the parallel or substantially parallel electrically conductive material bands may be separated from one another by a non-electrically conductive gap. Other methods of electrically insulating conductive material bands of a conductive layer may also be suitable.

In some embodiments, a portion of the electrically conductive layers 206, 210 can protrude beyond one or more corresponding edges of insulator layers 203, 204, 205, 207, 208, 209, for example to facilitate electrical coupling of the conductive layers 206, 210 at the first end 201 and/or the second end 202. In some embodiments, the electrically conductive layers 206, 210 can be laterally displaced with respective to one or more of insulator layers 203, 204, 205, 207, 208, 209, such that a portion of the electrically conductive layers 206, 210 protrude beyond one or more corresponding edges of the insulator layers 203, 204, 205, 207, 208, 209. In some embodiments, a portion of the electrically conductive layer 206 may extend beyond the insulator layers 203, 204, 205, 207, 208, 209 along an edge of each of the insulator layers 203, 204, 205, 207, 208, 209 at the first end 201. In some embodiments, a portion of the electrically conductive layer 210 may extend beyond an edge of each of the insulator layers 203, 204, 205, 207, 208, 209 at the second end 202. For example, the conductive layers 206 and 210 extending beyond opposing edges of the insulator layers 203, 204, 205, 207, 208, 209 at the first end 201 and the second end 202 can be used for coupling the capacitor cell 200 to another capacitor cell and/or an external circuit. In other embodiments, the conductive layers 206, 210 do not protrude beyond corresponding edges of insulator layers 203, 204, 205, 207, 208, 209. For example, the conductive layers 206, 210 can be electrically coupled at the first end 201 and/or the second end 202 using conductive tabs, contacts, and/or the like.

An insulator layer can be made of a variety of electrically insulating materials, including for example a polypropylene material, a cellulose material (e.g., paper), a polyethylene material, combinations thereof, and/or other suitable insulating materials for electrode applications. A conductive layer can be made of numerous suitable electrically conductive materials, such as an aluminum material (e.g., an aluminum foil). In some embodiments, the polypropylene material can be metallized (e.g., metallized polypropylene, PPMT). For example, a capacitor cell can include a layer of metallized polypropylene, a layer of polypropylene and a layer of aluminum foil.

Figure 3A:
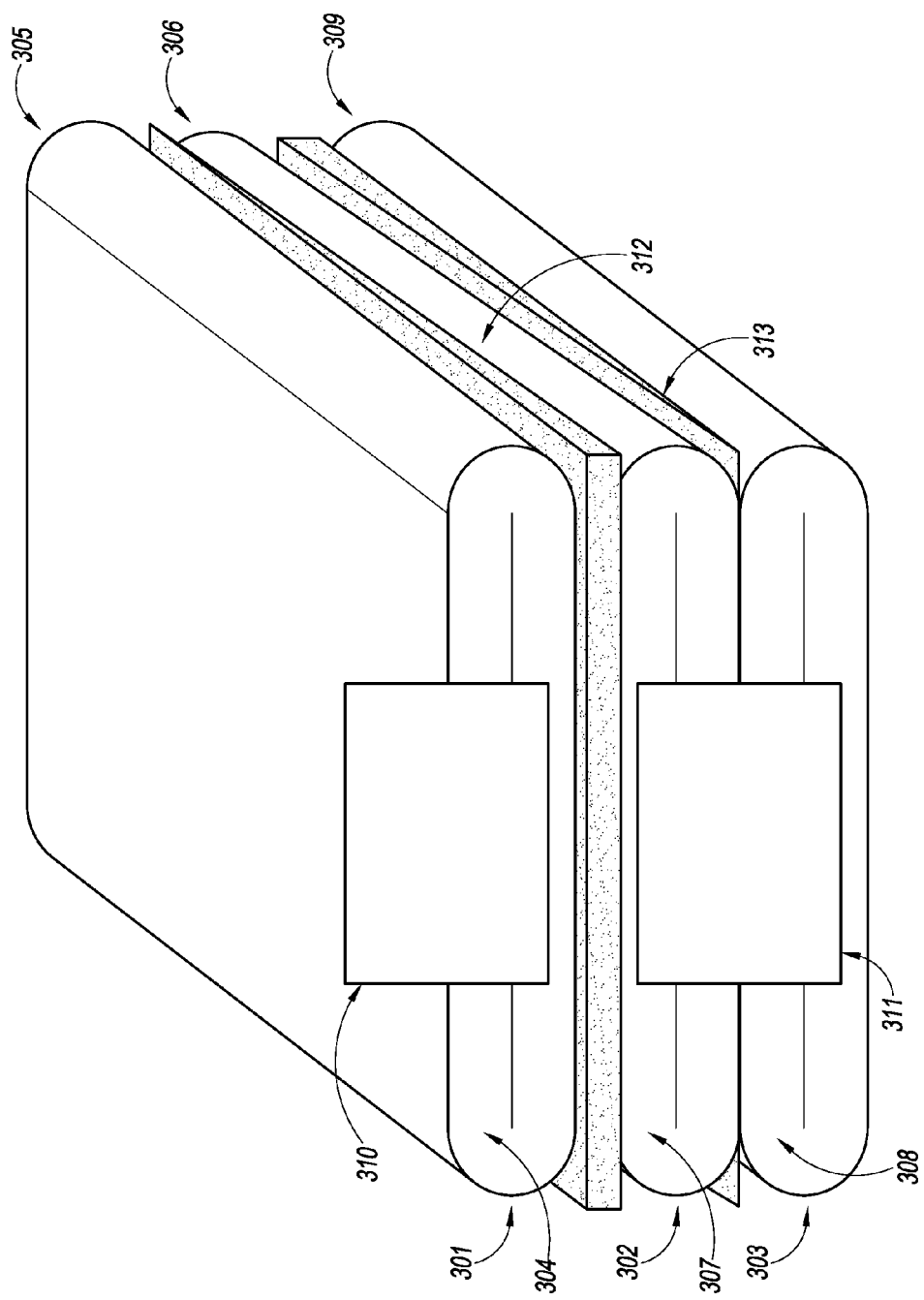
FIG. 3A shows a perspective view of three capacitor cells of a high voltage capacitor coupled in electrical series.
Figure 3B:
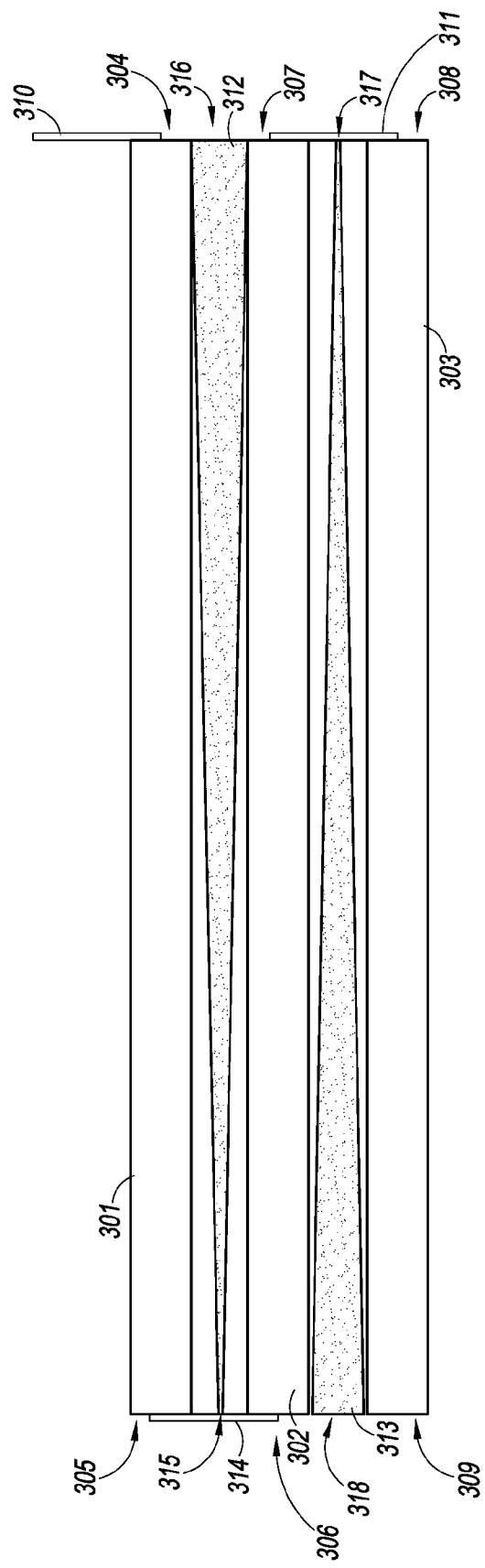
FIG. 3B shows a side view of the capacitor cells of FIG. 3A.

FIG. 3A shows a perspective view of three capacitor cells 301, 302, 303 connected in electrical series, with each of individual capacitor cells 301, 302, 303 forming a capacitor unit. An insulator element 312 can be positioned between capacitor cells 301 and 302, and an insulator element 313 can be positioned between capacitor cells 302 and 303. FIG. 3B shows a side view of the capacitor cells 301, 302, 303 and insulator elements 312, 313 shown in FIG. 3A. Referring to both FIGS. 3A and 3B, the capacitor cells 301, 302, 303 may be a part of a capacitor configured to provide high voltage performance, such as, for example, capacitor 100 of FIG. 1. The capacitor cells 301, 302, 303 may be electrically coupled to one another using a plurality of conductive tabs. Capacitor cell 301 can have a first end 304 and an opposing second end 305. Capacitor cell 302 can have a first end 306 and an opposing second end 307, and capacitor cell 303 can have a first end 308 and an opposing second end 309. In some embodiments, the first capacitor cell 301 can be electrically coupled to the second capacitor cell 302 by electrically coupling the second end 305 of the first capacitor cell 301 and the first end 306 of the second capacitor cell 302. The second capacitor cell 302 may be electrically coupled to the third capacitor cell 303 by electrically coupling the second end 307 of the second capacitor cell 302 to the first end 308 of the third capacitor cell 303, and so forth.

The capacitor cells can be electrically coupled in any suitable way. For example, the first capacitor cell 301 can be coupled to an adjacent capacitor cell above (not shown) at the first end 304 of the capacitor 301 using a conductive tab 310. The first capacitor cell 301 may be coupled to the second capacitor cell 302 in electrical series by electrically coupling the second end 305 of the first capacitor cell 301 to the first end 306 of the second capacitor cell 302 using a conductive tab 314 (FIG. 3B). Referring again to both FIGS. 3A and 3B, the second capacitor cell 302 can be coupled to the third capacitor cell 303 in electrical series by electrically coupling the second end 307 of the second capacitor cell 302 to the first end 308 of the third capacitor cell 303, for example using conductive tab 311.

Various methods can be used for coupling a capacitor cell to an adjacent capacitor cell. In some embodiments, various suitable welding techniques can be used to couple aluminum foils with one another, and/or couple an aluminum foil with another conductive element (e.g., conductive tabs). For example, suitable welding techniques can include solid-state laser welding, and/or gas laser welding. In some embodiments, ultrasound welding can be suitable. In some embodiments, soldering can be suitable. In some embodiments, the capacitor cells can be coupled to one another using a metallization technique, including for example shoopage and/or electrolytic deposition. In some embodiments, the capacitor cells can be coupled to one another using an adhesive, such as a conductive resin and/or a glue (e.g., a conductive glue).

In some embodiments, an insulator element can be positioned between two adjacent capacitor cells, such as two adjacent capacitor cells connected in electrical series. For example, insulator element 312 can be positioned between adjacent capacitor cells 301, 302, and insulator element 313 can be positioned between adjacent capacitor cells 302, 303. In some embodiments, one or more of the insulator elements 312, 313 can have a wedge-shape. For example, a first edge of the insulator element 312 proximate to the electrical coupling between the first capacitor cell 301 and the second capacitor cell 302 can have a thinner thickness than an opposing second edge of the insulator element 312, and a first edge of the insulator element 313 proximate to the electrical coupling between the second capacitor cell 302 and the third capacitor cell 303 can have thinner thickness than an opposing second edge of the insulator element 313.

The size and/or shape of the insulator elements can be selected to reduce the cumulative volume and/or height of the capacitor cells 301-303, while providing desired separation between adjacent capacitor cells. Referring to FIG. 3B, a first end 315 of the insulator element 312 proximate to the electrical coupling between the first capacitor cell 301 and the second capacitor cell 302 (e.g., proximate to conductive tab 314) can have a dimension (e.g., a height or thickness) less than that of a second opposing end 316 of the insulator element 312 (e.g., the end of the insulator element 312 proximate to ends of the first capacitor 301 and second capacitor 302 not electrically coupled to one another). A first end 317 of the insulator element 313 proximate to the electrical coupling between the second capacitor 302 and the third capacitor 303 (e.g., proximate to conductive tab 311) can have a dimension (e.g., a height or thickness) less than that of the second opposing end 318 of the insulator element 313 (e.g., the end of the insulator element 313 proximate to ends of the second capacitor 302 and third capacitor 303 not electrically coupled to one another).

As shown in FIG. 3B, the insulator elements between adjacent capacitor cells may be positioned in alternating configurations in the stack, and opposite with respect to their corresponding differences in dimensions (height or thickness). For example, a thinner end of a first insulator element can be positioned at the same end of the stack as a thicker end of a second insulator element, and vice versa, at the opposed end of the stack, to provide an overall reduction in the combined height or thickness of the two insulator elements. For example, a thinner end of a first insulator element can be positioned proximate to (e.g., aligned with) a first edge of the stack, while a thicker end of a second insulator element immediately below or above the first insulator in the stack can be positioned proximate to (e.g., aligned with) the same first edge of the stack. In this way, the first and second insulator elements, each with opposing ends of different heights or thicknesses, are positioned in alternating configuration within the stack relative to each other. Thus, a thicker edge of the first insulator element is on top of the thinner edge of the second insulator element, and vice versa, to provide an opposite orientation which reduces the combined height of the two insulator elements. This alternating configuration can be applied to two insulator elements that are sequential, or non-sequential, with respect to each other along the height of the stack.

Figure 3C:
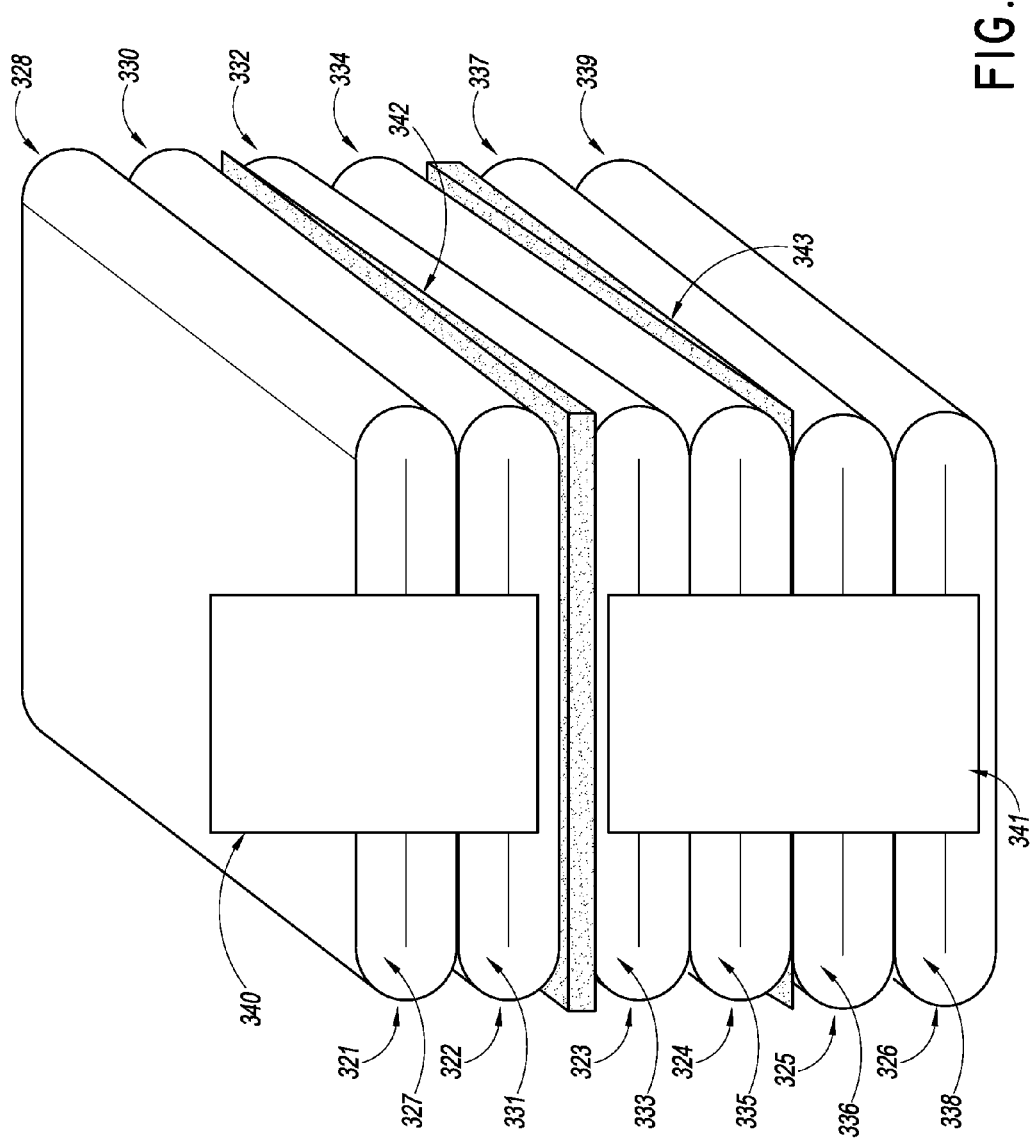
FIG. 3C shows a perspective view of three pairs of electrically parallel capacitor cells coupled in electrical series with one another.

In some embodiment, a first capacitor unit comprising two or more electrically parallel capacitor cells can be coupled in electrical series with adjacent capacitor cells. For example, two or more capacitor cells can be electrically connected in parallel to each other, forming a first capacitor unit. The first capacitor unit may be connected in electrical series with two or more additional capacitor cells, also electrically connected in parallel, which form a second capacitor unit, and so forth. Referring to FIG. 3C, for example, a first capacitor cell 321 can be coupled in electrical parallel to a second capacitor cell 322, to form a first capacitor unit. A third capacitor cell 323 can be coupled in electrical parallel to a fourth capacitor cell 324, to form a second capacitor unit. A fifth capacitor cell 325 can be coupled in electrical parallel to a sixth capacitor cell 326, to form a third capacitor unit. The electrically parallel capacitor cells 321, 322 (the first capacitor unit) can be coupled in electrical series with electrically parallel capacitor cells 323, 324 (the second capacitor unit) and the electrically parallel capacitor cells 323, 324, can be coupled in electrical series with electrically parallel capacitor cells 325, 326 (the third capacitor unit). In some embodiments, the electrically parallel capacitor cells 321, 322 can be coupled to the electrically parallel capacitor cells 323, 324 at the second ends 328, 330 of the capacitor cells 321, 322 and at the first ends of the capacitors 323, 324. In some embodiments, the electrically parallel capacitor cells 323, 324 can be coupled to the electrically parallel capacitor cells 325, 326 at the second ends 333, 335 of capacitor cells 323, 324 and at the first ends 336, 338 of capacitor cells 325, 326, for example through conductive tab 341. The capacitor cells 321, 322, 323, 324, 325, 326 may be coupled to one another, for coupling in electrical series or in parallel, using one or more suitable methods, including one or more methods described herein (e.g., welding, soldering, metallization, and/or application of an adhesive).

As shown in FIG. 3C, in some embodiments, an insulator element 342 can be positioned between adjacent capacitor cells 322, 323 coupled in electrical series, and an insulator element 343 can be positioned between adjacent capacitor cells 324, 325 coupled in electrical series. As described herein, one or more of the insulator elements can have a wedge shape such that a first edge of the insulator element proximate to a coupling between adjacent capacitor cells in electrical series has a thickness significantly thinner than a thickness of a second opposing edge of the insulator element.

Figure 4:
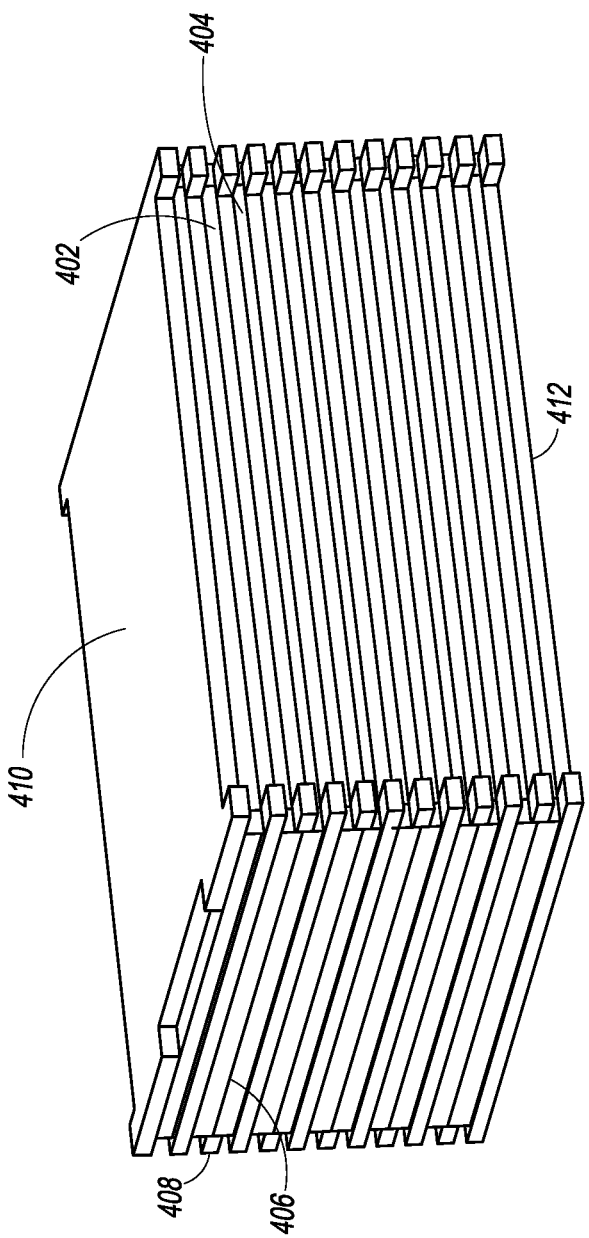
FIG. 4 shows a perspective view of an embodiment of a plurality of capacitor cells in a stacked configuration having a corresponding plurality of insulator elements between adjacent capacitor cells.

FIG. 4 shows a perspective view of an example of a plurality of capacitor cells in a stacked configuration with a plurality of wedge-shaped insulator elements between adjacent capacitor cells in the stack. The plurality of capacitor cells may be connected in electrical series and positioned one over the next to provide the stack of capacitor cells in electrical series. For example, the stack of plurality of capacitor cells can include a first capacitor cell 402 and a second adjacent capacitor cell 404. One end of the first capacitor cell 402 can be connected to a corresponding end of the second adjacent capacitor cell 404 at a connection portion 406 such that the capacitor cells 402 and 404 are connected in electrical series. The first capacitor cell 402 may be positioned over the second adjacent capacitor cell 404 (e.g., stacking the first capacitor cell 402 and the second adjacent capacitor cell 404), to facilitate electrical coupling of the adjacent capacitor cells 402, 404 at the connection portion 406.

A wedge-shaped insulator element 408 can be placed between the two adjacent capacitor cells 402, 404. As described herein, an insulator element placed between two adjacent capacitor cells is described as an "intermediary insulator element" as distinguished from a "top insulator element" or "bottom insulator element" described further below. As shown in FIG. 4, an intermediary wedge-shaped insulator element can be positioned, for example, between each pair of adjacent capacitor cells. For example, an intermediary wedge-shaped insulator element, such as the insulator element 408, may be configured to provide a desired electrical and/or physical separation between two adjacent capacitor cells, such as the first capacitor cell 402 and the second adjacent capacitor cell 404. As shown, the insulator element 408 can have a wedge shape where a first edge of the insulator is thinner than a second opposing edge of the insulator. This configuration can facilitate a reduced volume or weight for the high voltage capacitor.

In some embodiments, a shape and/or dimension of an intermediary insulator element may depend on a shape and/or dimension of a capacitor cell adjacent to the insulator element. FIG. 4 shows a plurality of rectangular or substantially rectangular shaped intermediary insulator elements between a plurality of rectangular or substantially rectangular capacitor cells. The plurality of rectangular or substantially rectangular shaped intermediary insulator elements can have a length and/or a width similar to that of adjacent capacitor cells. The intermediary insulator element and/or the capacitor cells adjacent to the intermediary insulator element can have other suitable shapes. In some embodiments, the intermediary insulator element and adjacent capacitor cells can have a rounded shape, including a circular or substantially circular shape. A dimension (e.g., a length, width, and/or diameter) of the intermediary insulator element can depend on a dimension of an adjacent capacitor cell. In some embodiments, an intermediary insulator element can have a lateral dimension to provide sufficient electrical insulation between adjacent capacitor cells. For example, the intermediary insulator element can have a dimension configured to provide desired electrical insulation between adjacent capacitor cells while facilitating a high voltage capacitor having a reduced volume.

FIG. 4 also shows a top insulator element 410 over a top capacitor cell of the stack of capacitor cells and a bottom insulator element 412 below a bottom capacitor cell of the stack of capacitor cells. In some embodiments, the top insulator element 410 and/or the bottom insulator element 412 can have a shape different from one or more of the wedge-shaped intermediary insulator elements, for example different from the insulator element 408 between adjacent capacitor cells 402, 404. In some embodiments, one or both of the top insulator element 410 and the bottom insulator element 412 may not have a wedge shape. For example, the top insulator element 410 and/or the bottom insulator element 412 can have a shape where the insulator element has a uniform or substantially uniform thickness along two perpendicular dimensions of the insulator element. For example, in a stack of capacitor cells having an even number of intermediary insulator elements, both the top insulator element and the bottom insulator element may not have a wedge shape. For example, in a stack of capacitor cells having an odd number of intermediary insulator elements, one of the top insulator element or the bottom insulator element may not have a wedge shape.

Figure 5A:
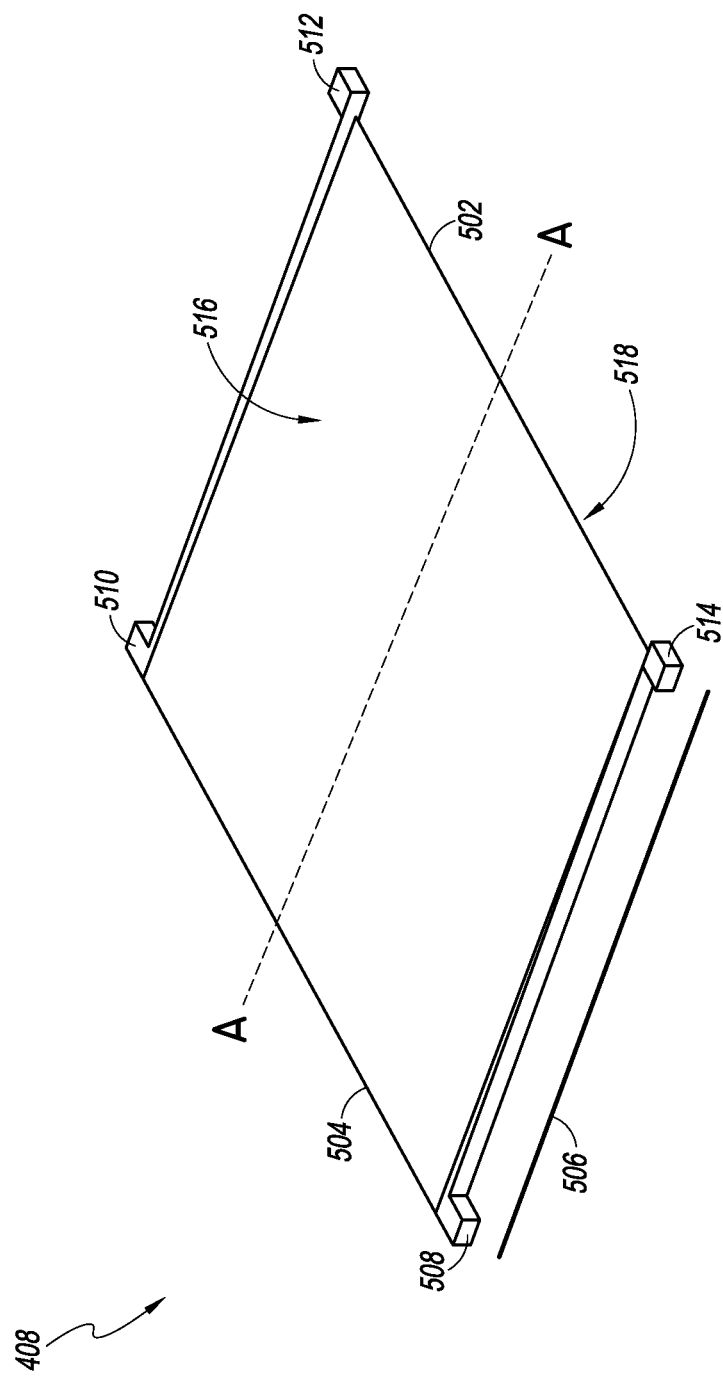
FIG. 5A shows a perspective view an example of an insulator element.

FIG. 5A shows a perspective view of the insulator element 408 of FIG. 4. The insulator element 408 may be used within a high voltage capacitor which has a reduced volume and/or weight, relative to a similar capacitor with an insulator element of uniform shape. The insulator element 408 may have a rectangular or substantially rectangular shape. For example, element 408 can have a rectangular or substantially rectangular shape when viewed along an axis perpendicular to the A-A line. The insulator element 408 has a first edge at a first 502 and an opposite second edge at an opposite second end 504 that is parallel or substantially parallel to the first edge at the first end 502. The first edge at the first end 502 and the opposite second edge at the opposite second end 504 may have a same or similar length.

In an assembled high voltage capacitor having a plurality of capacitor cells connected in series and stacked one over the next, the insulator element 408 is positioned between two adjacent capacitor cells (e.g., two adjacent capacitor cells connected in series as shown in FIG. 4). The first end 502 of the insulator element 408 may be next to a connection portion for connecting the two adjacent capacitor cells (e.g., connection portion 406 between adjacent capacitor cells 402, 404 as shown in FIG. 4). The second end 504 of the insulator element 408 may be next to ends of the adjacent capacitor cells which do not connect the adjacent capacitor cells (e.g., next to ends of the adjacent capacitor cells 402, 404 which are not connected to one another).

The insulator element 408 may have a non-uniform thickness. The insulator element 408 may have a significantly thinner thickness at the first end 502 than at the second end 504. A thickness of the insulator element 408 can decrease linearly or substantially linearly along the A-A line in a direction from the second end 504 (e.g., an end proximate to a connection point between two adjacent capacitor cells connected in series) to the first end 502 (e.g., an end proximate to un-connected ends of two adjacent capacitor cells), while a thickness of the insulator element 500 remains constant or substantially constant along a dimension perpendicular to the A-A line. In some embodiments, the variation in thickness along the A-A line may be linear or substantially linear and/or non-linear or substantially non-linear.

Referring again to FIG. 5A, an insulator element can have one or more protrusions (e.g., tab-like protrusions) along one or more edges of the insulator element. Referring to FIG. 5A, the insulator element 408 can have protrusions 508, 510, 512, 514 with a rectangular or substantially rectangular shape at each of its four corners. The protrusions 508, 510, 512, 514 may have a configuration (e.g., a shape and/or dimension) for providing physical stability to adjacent capacitor cells within a high voltage capacitor, for example for facilitating maintenance of adjacent capacitor cells in their respective places, while facilitating a high voltage capacitor having a reduced volume. Each of the protrusions 508, 510, 512, 514 of insulator element may have a uniform thickness along two perpendicular dimensions. For example, each of the protrusions 508, 510, 512, 514 may have a thickness along two perpendicular dimensions the same as or substantially the same as a thickness of the second end 504 of the insulator element.

An insulator element may have fewer or more protrusions extending along one or more of its edges. Positioning of a protrusion along an edge of an insulator element can depend on various factors, including a shape and/or a dimension of the insulator element, a shape and/or dimension of the protrusion. A material for a protrusion may or may not be a similar material as the insulator element to which the protrusion is attached.

Figure 5B:
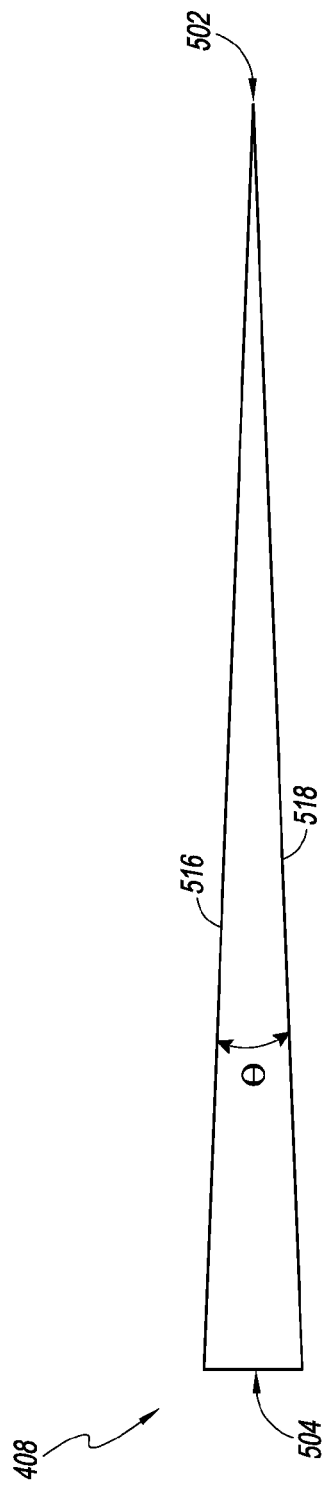
FIG. 5B shows a cross section view of the insulator element of FIG. 5A, according to one embodiment.

FIG. 5B shows a cross section view of insulator element 408 along the A-A line shown in FIG. 5A, according to one embodiment. According to the embodiment, a cross section of insulator element 408 along the A-A line can have a triangular shape such that a top surface 516 of the insulator element 408 and an opposing bottom surface 518 can meet at an apex that extends along an edge at the first end 502 of the insulator element 408.

In some embodiments, the cross-section view of the insulator element 408 along the A-A line may have an isosceles triangle shape. In some embodiments, a cross-section of the insulator element 408 along the A-A line may have a shape comprising a right triangle. In some embodiments, a cross-section of the insulator element 408 along the A-A line may have a shape comprising an acute triangle. In these triangular-shaped embodiments, the shape of the insulator element as viewed along other axes or directions can be of uniform thickness, for example, such as the aforementioned rectangular shapes described above with reference to FIG. 5A.

In some embodiments, a thickness of the triangle shaped insulator element 408 at the second end 504 can be about 1.0 millimeters (mm) to about 5.0 mm, including about 1.0 mm to about 3.0 mm. For example, a thickness of the insulator element 408 at the second end 504 can be about 1.5 mm to about 2.5 mm, including about 2.0 mm. In some embodiments, a thickness of the insulator element 408 at the first end 502 can be about 0.01 mm or less, including about 0.002 mm or less. For example, a thickness of the insulator element 408 at the first end 502 can be about 0.001 mm.

In some embodiments, the insulator element 408 having the triangular shape can have an angle (θ) between the top surface 516 of the insulator element 408 and an opposing bottom surface 518 of about 0.5° to about 10°, including about 0.5° to about 8°, or about 0.5° to about 6°, or about 0.5° to about 4°. These angles can be selected to provide sufficient insulating performance, while providing the benefits in volume and thickness reduction described herein.

Figure 5C:
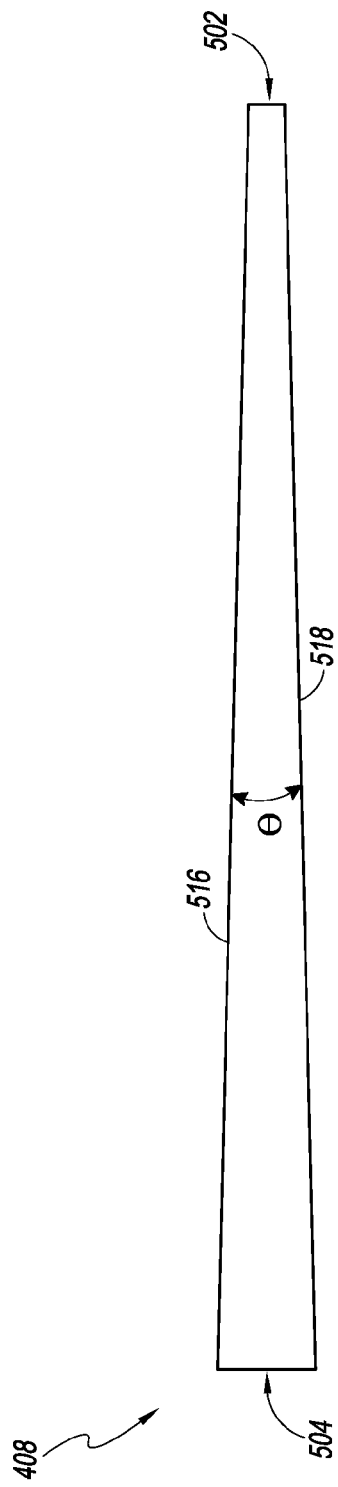
FIG. 5C shows a cross section view of the insulator element of FIG. 5A, according to another embodiment.

FIG. 5C shows a cross section view of the insulator element 408 along the A-A line shown in FIG. 5A, according to another embodiment. According to this embodiment, a cross section of insulator element 408 along the A-A line can have a trapezoid or substantially trapezoid shape such that a top surface 516 of the insulator element 408 and an opposing bottom surface 518 do not meet along an edge at the first end 502 of the insulator element 408. For example, the first end 502 may have a significant thickness.

In some embodiments, a cross-section of the insulator element 408 along the A-A line may have a right trapezoid shape. In some embodiments, a cross-section of the insulator element 408 along the A-A line may have an isosceles trapezoid shape. In some embodiments, a cross-section of the insulator element 408 along the A-A line may have a scalene trapezoid shape. In these trapezoid-shaped embodiments, the shape of the insulator element as viewed along other axes or directions can be of uniform thickness, for example, such as the aforementioned rectangular shapes described above with reference to FIG. 5A.

In some embodiments, a thickness of the trapezoid shaped insulator element 408 at the second end 504 can be about 1.0 mm to about 5.0 mm, including about 1.0 mm to about 3.0 mm. For example, a thickness of the insulator element 408 at the second end 504 can be about 1.5 mm to about 2.5 mm, including about 2.0 mm. In some embodiments, a thickness of the insulator element 408 at the second end 504 can be up to about 50 times that of the thickness at the first end 502, including about 5 times to about 45 times, about 5 times to about 40 times, about 10 times to about 30 times.

In some embodiments, the insulator element 408 having the trapezoid shape can have an angle (θ) between the top surface 516 of the insulator element 408 and an opposing bottom surface 518 of about 0.5° to about 10°, including about 0.5° to about 8°, about 0.5° to about 6°, or about 0.5° to about 4°. These angles can be selected to provide sufficient insulating performance, while providing the benefits in volume and thickness reduction described herein.

A capacitor including one or more insulator elements having a non-uniform thickness along at least one dimension may advantageously facilitate providing capacitors having decreased volume (and thus decreased height), relative to a similar capacitor with a similar number of insulator elements, but with uniform thickness along its length and width. For example, an insulator element with a first thickness at a first edge, and a thickness which decreases along a dimension perpendicular to the first edge such that a second thickness at a second edge is significantly smaller than the first thickness, can have a volume smaller than an insulator element whose thickness remains constant or substantially constant at the first thickness along the perpendicular dimension from the first end to the second end. When a plurality of such insulator elements are stacked in alternating configurations within the stack, such as described above with reference to FIG. 3B, the reduction in volume, and thus, the reduction in the overall height, of the combined cell stack, is multiplied. Such benefits can be further multiplied in energy storage devices with a large number of electrode or cell stacks, such as a high voltage capacitor. Alternatively, insulator elements having a reduced volume may allow more cells to be employed compared to a capacitor with a plurality of insulator elements with uniform thickness, of a similar space envelope. Thus, a plurality of stacked, reduced volume insulator elements can in turn provide an increase in an energy density performance of the high voltage capacitor within a given space element. In some embodiments, insulator elements having a reduced volume can facilitate a high voltage capacitor having a reduced volume and/or weight, providing more compact and/or lighter high voltage capacitors. Smaller and/or lighter high voltage capacitors may facilitate a reduction in an operation and/or manufacturing cost of the high voltage capacitors, and/or facilitate their use in additional applications.

In some embodiments, a high voltage capacitor including a plurality of wedge-shaped insulator elements can facilitate a reduction in a volume of the high voltage capacitor by about 15% to about 30%, while maintaining similar performance ratings as compared to a high voltage capacitor which included insulator elements which had equal or substantially equal thicknesses at the first end and the second opposing end, and uniform thickness across its length between the two opposing ends. For example, a high voltage capacitor including a plurality of wedge-shaped insulator elements may facilitate about a 20% reduction in a volume of the high voltage capacitor, while maintaining similar performance ratings.

An insulator element can have a variety of suitable thicknesses. A thickness of an insulator element placed between two adjacent capacitor cells of a high voltage capacitor can be configured to facilitate a reduced volume in the insulator element while providing an insulator element configured to provide desired separation between adjacent capacitor cells.

A thickness of a portion an insulator element can depend on a magnitude of an electric field proximate to that portion of the insulator element, for example the electric field present during operation of the high voltage capacitor. An electric field present during operation of the high voltage capacitor between two adjacent capacitor cells connected in series may increase from an end at which the two adjacent capacitor cells are connected to one another, to a second opposite end at which the cells are not connected to one another. For example, the electric field between adjacent capacitor cells proximate to and/or adjacent to the end at which the adjacent capacitor cells are connected to one another is zero or substantially zero, while the electric field proximate to and/or adjacent to the end at which the two adjacent capacitor cells are not connected to one another can have an increased value. In some embodiments, the electric field can decrease along the direction from the increased value proximate to and/or adjacent to the end at which the two adjacent capacitor cells are not connected to one another to zero or substantially zero proximate to and/or adjacent to the end at which the adjacent capacitor cells are connected to one another.

In some embodiments, an electric field present proximate to and/or adjacent to the end at which the two adjacent capacitor cells are not connected to one another during operation of the high voltage capacitor can have a value of about 1 kilovolt per millimeter (kV/mm) to about 50 kV/mm, including about 2 kV/mm to about 10 kV/mm, about 2 kV/mm to about 20 kV/mm, about 2 kV/mm to about 30 kV/mm. In some embodiments, the electric field present proximate to and/or adjacent to the end at which the two adjacent capacitor cells are not connected can be about 2 kV/mm during operation. In some embodiments, the electric field present proximate to and/or adjacent to the end at which the two adjacent capacitor cells are not connected can be about 30 kV/mm during operation, for example for high voltage capacitors impregnated in oil-based fluid. In some embodiments, the electric field can be even higher.

In some embodiments, a thickness of an insulator element can be scaled based on the magnitude of the electric field present, the insulator element increasing in thickness in a direction in which the electric field increases in magnitude. A thickness of a portion of the insulator element can be selected based on a magnitude of the electric field present proximate to the portion of the insulator element. For example, an increase of a thickness along a dimension of the insulator element can depend on a rate of increase of the electric field along that dimension.

An insulator element may be made of a variety of electrically insulating materials. An insulator material may be configured to provide desired physical protection of the capacitor cells of the high voltage capacitor. In some embodiments, an insulator material may be configured to have sufficient rigidity to facilitate maintaining the adjacent capacitor cells in place. In some embodiments, an insulator material may have a desired damping characteristic to facilitate absorption of any shocks and/or vibrational disturbances the high voltage capacitor may experience, protecting an integrity of capacitor cells within a high voltage capacitor. In some embodiments, a material for an insulator element can be configured to withstand an electric field present between the two adjacent capacitor cells during operation of the high voltage capacitor. In some embodiments, a material for an insulator element can include a material which does not demonstrate a dielectric breakdown under the stress of the electrical field present during operation of the device such that an electrical discharge does not occur across a portion of the insulator element (e.g., does not demonstrate a partial discharge phenomenon).

Examples of materials for an insulator element can include various types of polymeric material. For example, an insulator element can be made of polypropylene. Other suitable materials can include polytetrafluoroethylene (PTFE), polyether ether ketone (PEEK), meta-aramid polymer (e.g., Nomex®), and/or combinations thereof.

Figure 6:
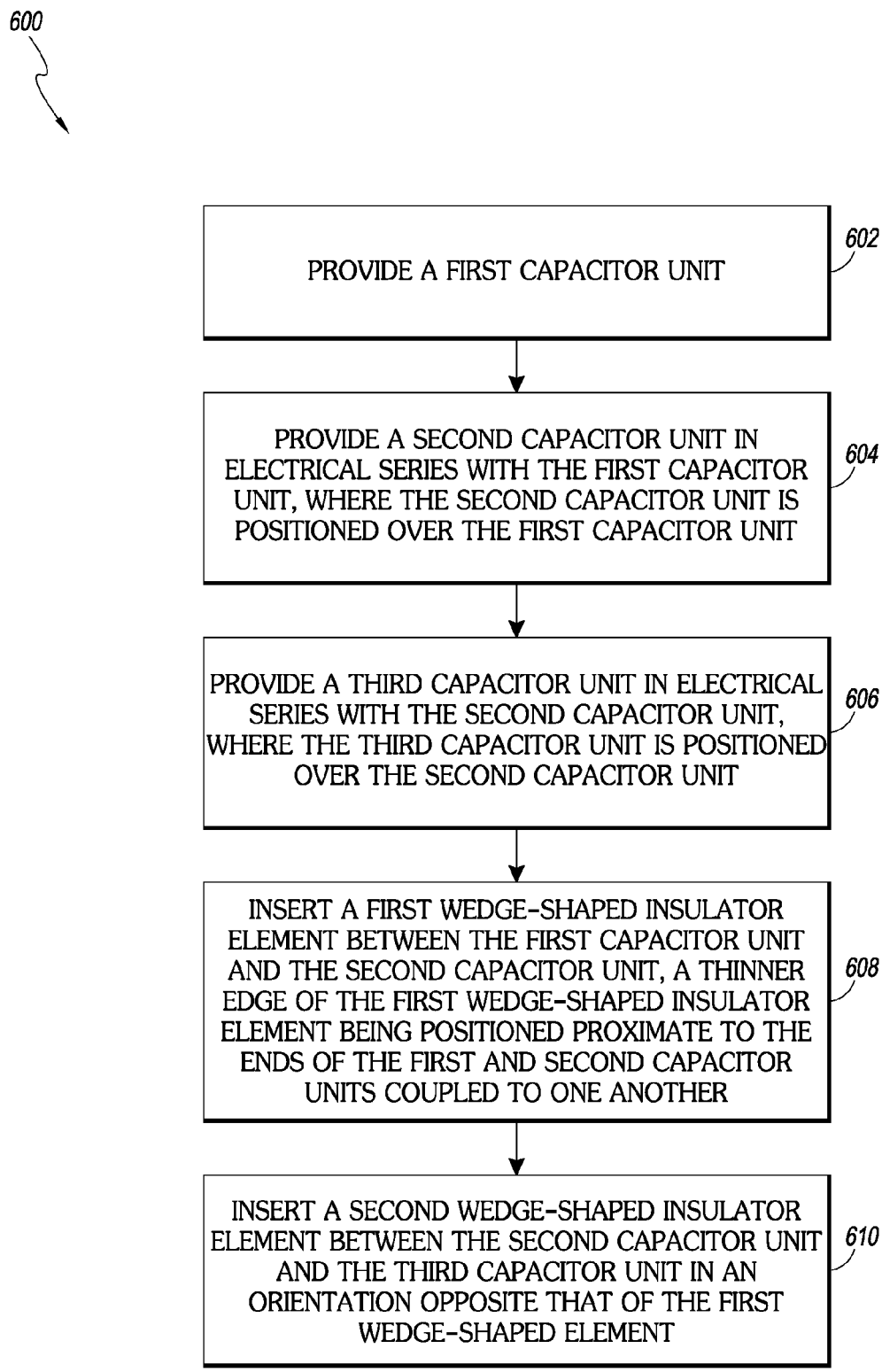
FIG. 6 shows a flow diagram of an example of a process for fabricating a high voltage capacitor.

FIG. 6 shows an example of a process 600 for fabricating a high voltage capacitor. In block 602, a first capacitor unit can be provided. In block 604, a second capacitor unit can be provided in electrical series with the first capacitor unit, where the second capacitor unit can be positioned over the first capacitor unit. For example, one end of the first capacitor unit may be electrically coupled to a corresponding end of the second capacitor unit to couple the first capacitor unit and the second capacitor unit in electrical series. In block 606, a third capacitor unit in electrical series with the second capacitor unit can be provided, where the third capacitor unit can be positioned over the second capacitor unit. For example, an end of the second capacitor unit opposite the end coupled to the first capacitor unit may be electrically coupled to a corresponding end of the third capacitor unit to couple the second capacitor unit and third capacitor unit in electrical series. In block 608, a first insulator element having a wedge-shape can be inserted between the first capacitor unit and the second capacitor unit, where a thinner edge of the first wedge-shaped insulator element can be positioned proximate to the ends of the first and second capacitor units which are coupled to one another. In block 610, a second insulator element having a wedge-shape can be inserted between the second capacitor unit and the third capacitor unit, where the second wedge-shaped insulator element can be inserted in an orientation opposite that of the first wedge shaped insulator element. For example, a thinner edge of the second wedge-shaped insulator element can be positioned proximate to the ends of the second and third capacitor units which are coupled to one another.

In some embodiments, one or more of the first, second and third capacitor units may comprise a plurality of individual capacitor cells in electrical parallel. For example, each of providing the first, second and/or third capacitor units (e.g., in blocks 602, 604, 606) may comprise providing a plurality of individual capacitor cells in a stacked configuration, where each capacitor unit comprises a plurality of individual capacitor cells connected in electrical parallel with one another. In some embodiments, one or more of the first, second and third capacitor units may comprise a single individual capacitor cell.

Figure 7A:
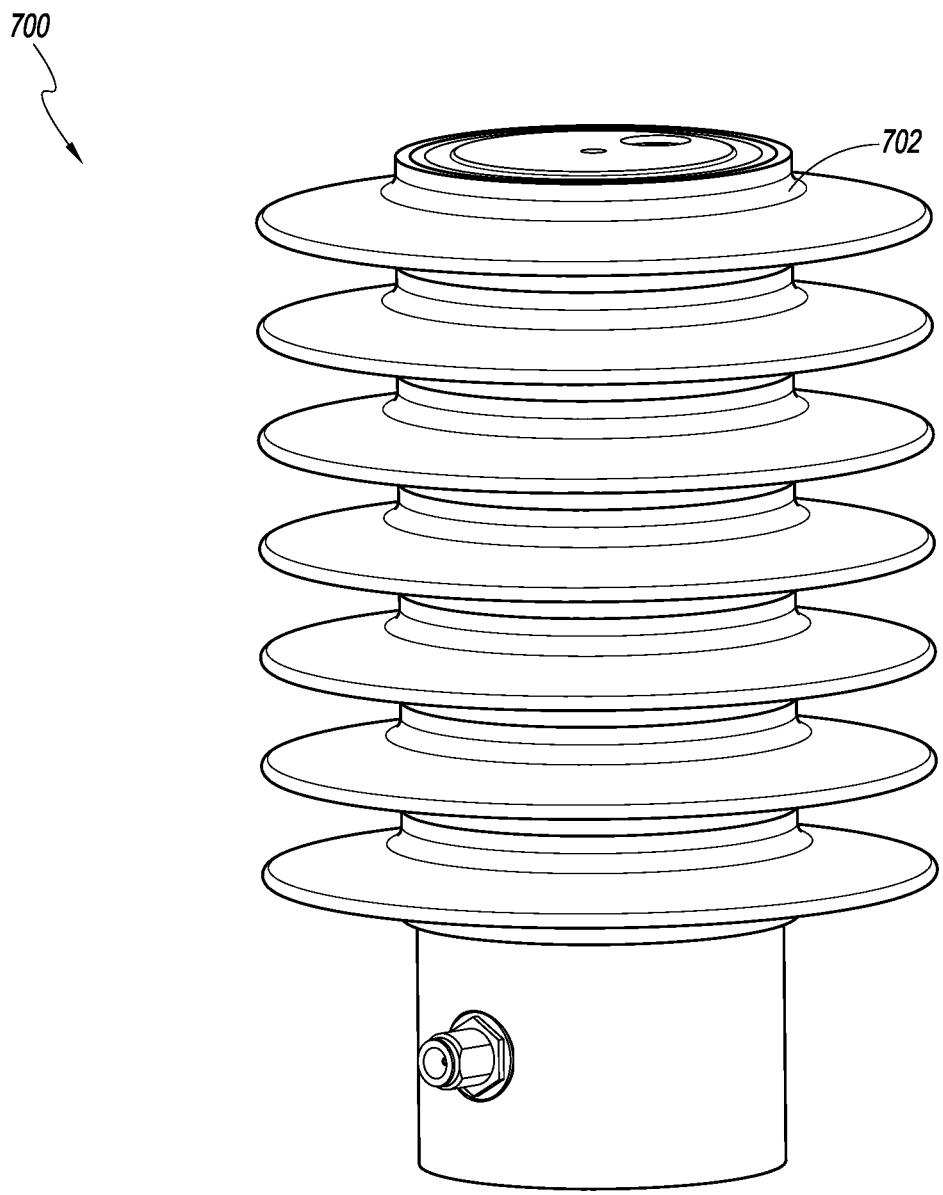
FIG. 7A shows a perspective view of an example of a high voltage capacitor.

FIGS. 7A through 9B show examples of high voltage capacitors according to one or more embodiments described herein. FIGS. 7A, 8A and 9A show perspective views of a high voltage capacitor 700, 800, 900, respectively. In some embodiments, high voltage capacitor 700 can be configured for use in power line communications. In some embodiments, high voltage capacitor 800 can comprise a partial-discharge coupler (PD Coupler). In some embodiments, high voltage capacitor 900 can comprise an electronic voltage transformer (EVT).

Figure 7B:
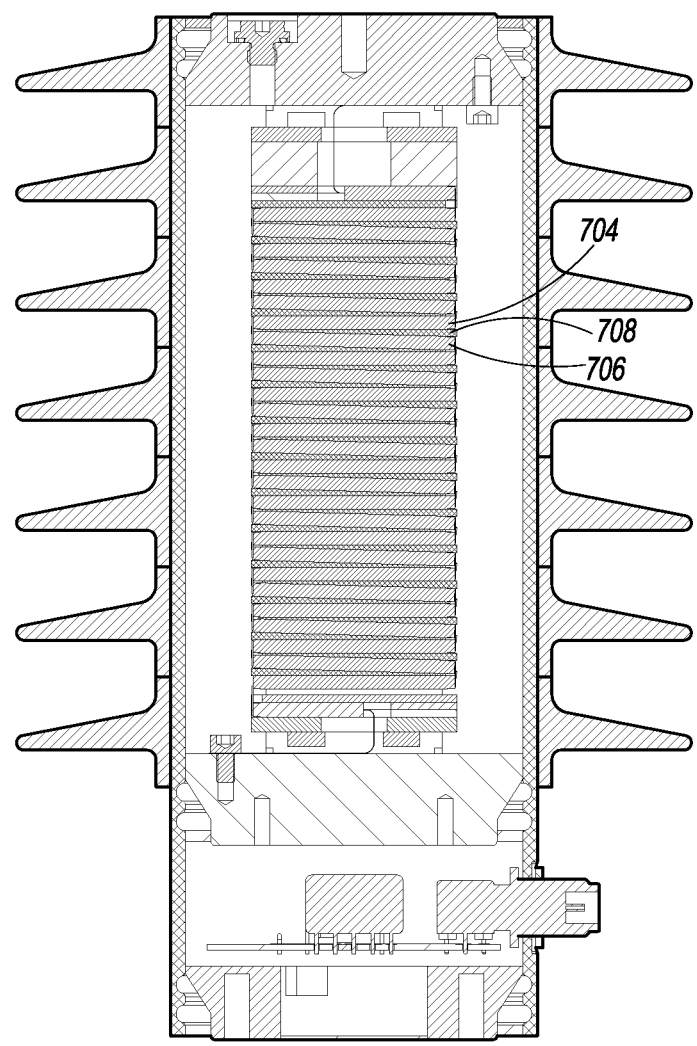
FIG. 7B shows a cross-sectional of the high voltage capacitor of FIG. 7A.
Figure 8A:
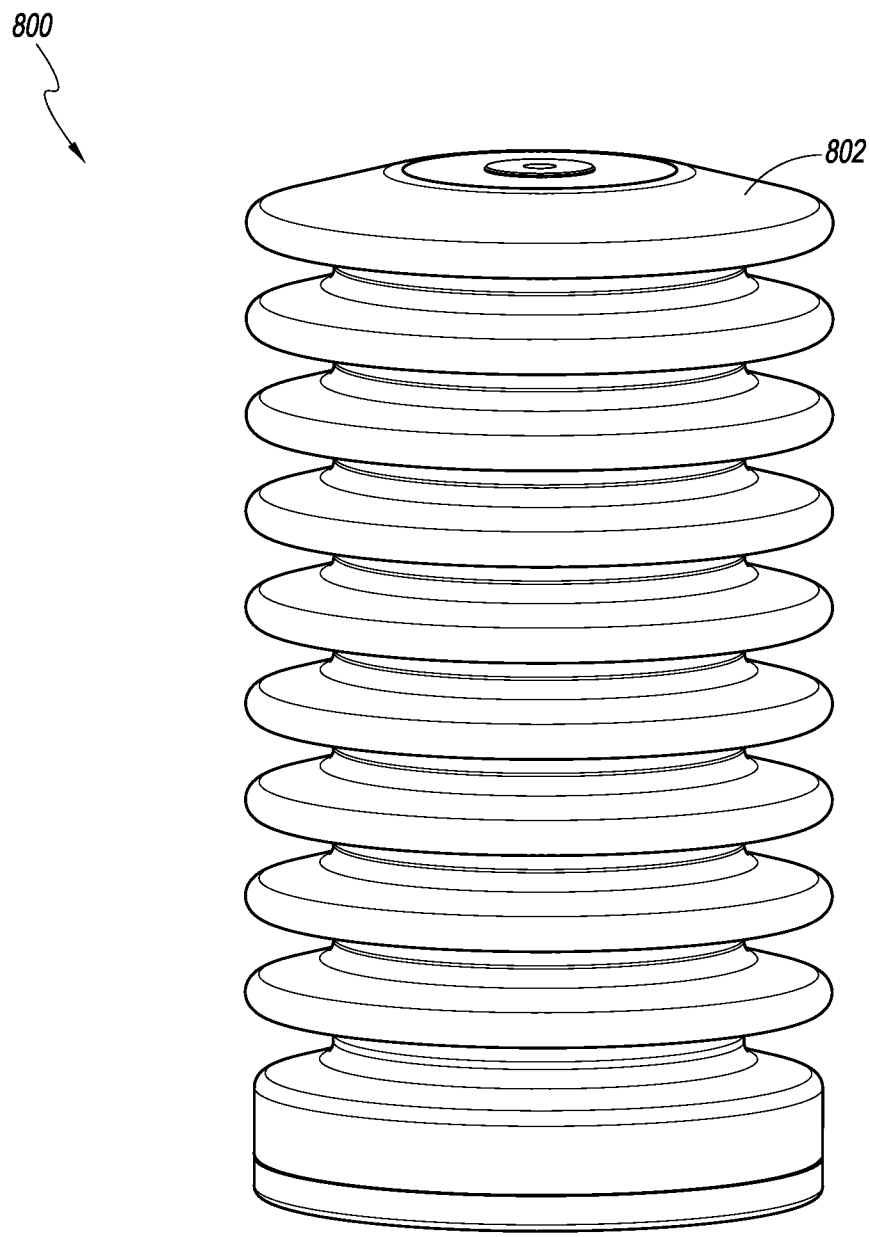
FIG. 8A shows a perspective view of another example of a high voltage capacitor.
Figure 8B:
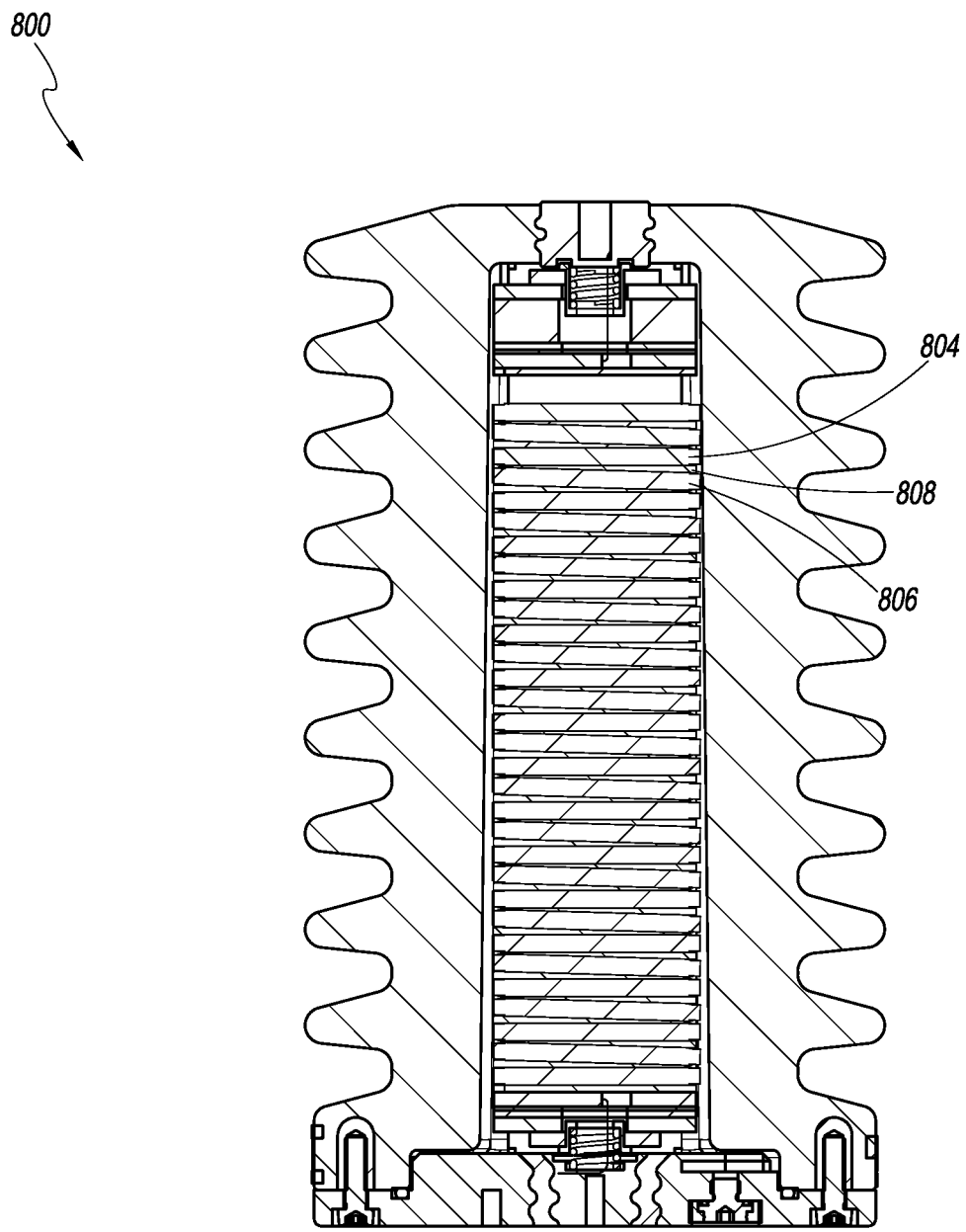
FIG. 8B shows a cross-sectional of the high voltage capacitor of FIG. 8A.
Figure 9A:
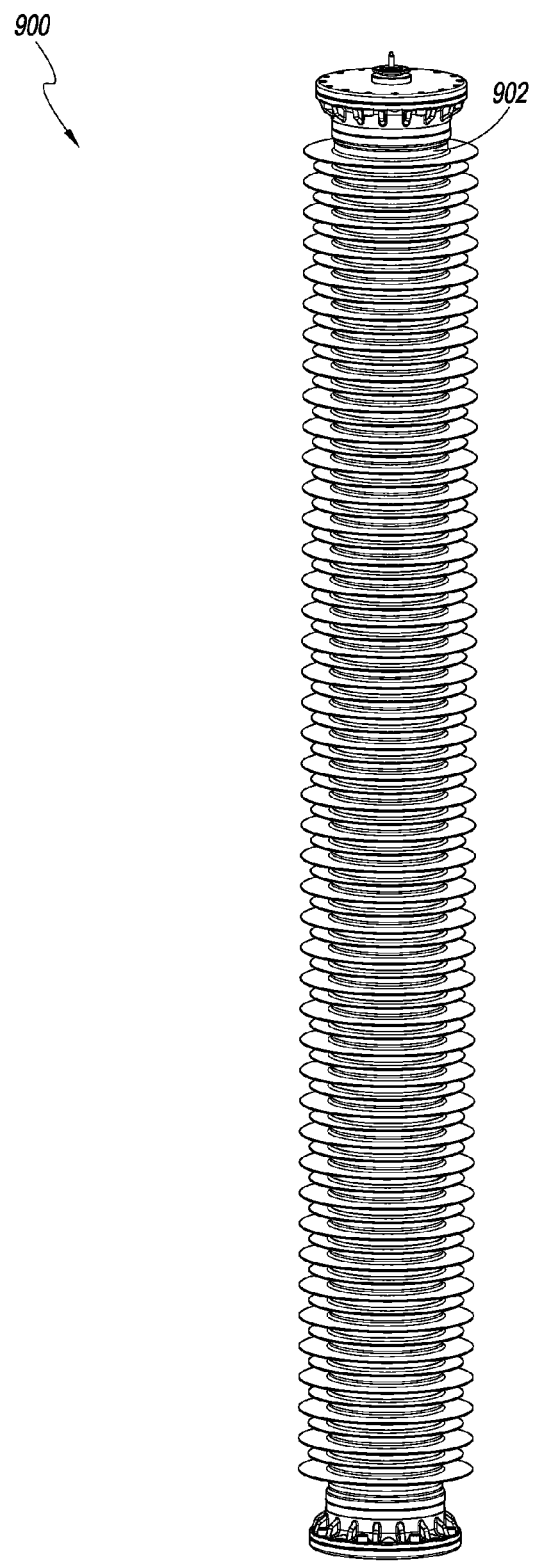
FIG. 9A shows a perspective view of yet another example of a high voltage capacitor.
Figure 9B:
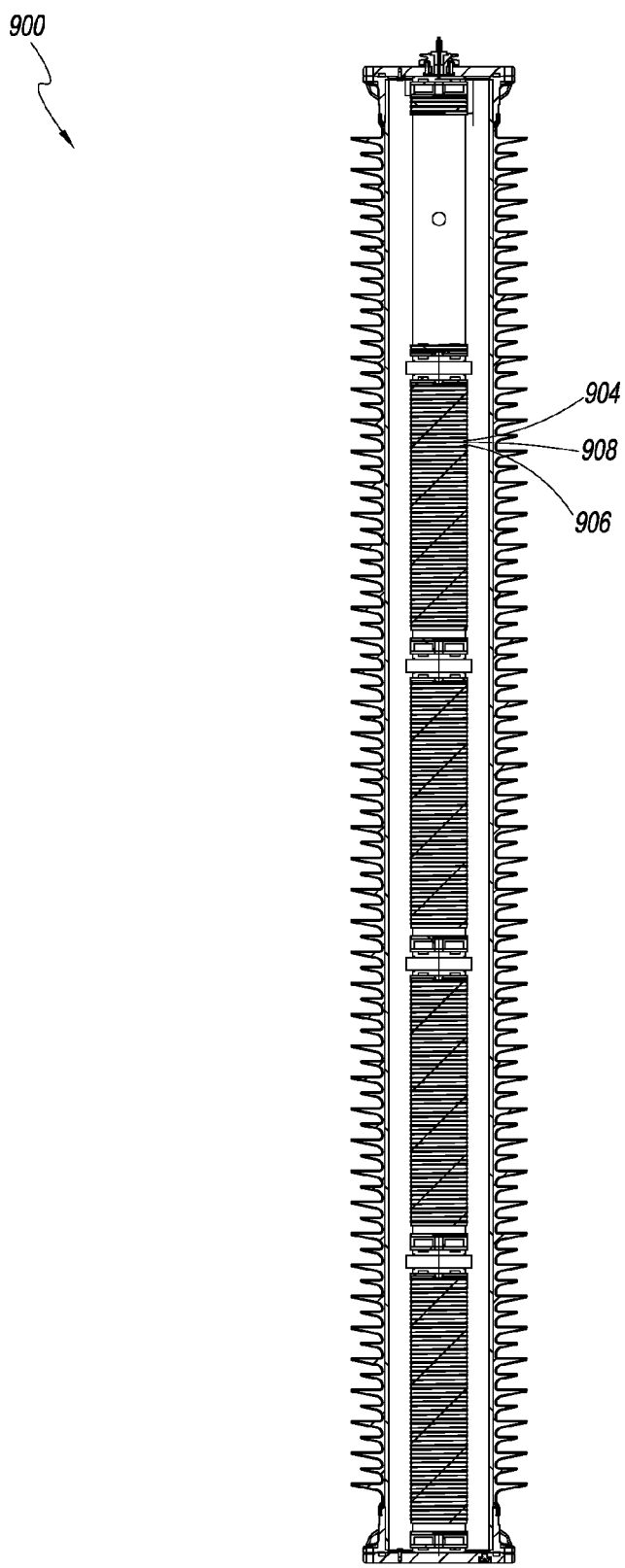
FIG. 9B shows a cross-sectional of the high voltage capacitor of FIG. 9A.

As shown, each of the high voltage capacitors 700, 800, 900 comprise a respective outer housing 702, 802, 902. FIGS. 7B, 8B and 9B show corresponding cross-sectional views of the high voltage capacitors 700, 800, 900. The high voltage capacitors 700, 800, 900 can each include a plurality of individual capacitor cells. For example, the high voltage capacitor 700 may include a first capacitor cell 704, a second adjacent capacitor cell 706, and a wedge-shaped insulator element 708 between the adjacent capacitor cells 704, 706. The high voltage capacitor 800 may include a first capacitor cell 804, a second adjacent capacitor cell 806, and a wedge-shaped insulator element 808 between the adjacent capacitor cells 804, 806. The high voltage capacitor 900 may include a first capacitor cell 904, a second adjacent capacitor cell 906, and a wedge-shaped insulator element 908 between the adjacent capacitor cells 904, 906. Each of the high voltage capacitors 700, 800, 900 may comprise a plurality of wedge-shaped insulator elements, the high voltage capacitors 700, 800, 900 each having a wedge-shaped insulator element between two adjacent capacitor cells one stacked over the other. The wedge-shaped insulator elements and the capacitor cells may form a stacked configuration. As shown in FIGS. 7B, 8B and 9B, the wedge-shaped insulator elements can be positioned between adjacent capacitor cells in alternating orientation, a thinner edge of a wedge-shaped insulator element aligned with an edge of the stack with which a thicker edge of an immediately adjacent wedge-shaped insulator element is aligned (e.g., the wedge-shaped insulator element immediately above or below in the stack).

Embodiments described herein may be configured for a variety of applications, including but not limited to applications in energy networking, such as energy generation (e.g., for applications in communication and monitoring, circuit breakers), energy transmission (e.g., for applications in circuit breakers, voltage measurement, AC/DC converters, communication and monitoring, and/or in power quality applications), energy distribution (e.g., in circuit breakers, voltage measurement, communication and monitoring, in power quality applications), and/or in energy traction network applications (e.g., in circuit breakers, in power quality applications). Embodiments described herein may be configured for industrial applications, including but not limited to, applications in MV motors (e.g., communication and monitoring applications), testing (e.g., HV laboratory applications), and/or systems applications (e.g., pulse forming network applications). Embodiments described herein may be configured for applications in transportation, such as railway applications, including but not limited to, traction on board applications (e.g., power quality applications, such as filtering applications, energy measurement applications).

Embodiments described herein may be configured for performing functions such as, but not limited to, AC/DC converters (e.g., filter AC, filter capacitor, filter DC, valves section capacitor), circuit breaker (e.g., corona ring, grading capacitor—AIS DS, grading capacitor—MS LT, grading capacitor—GIS, grading DC, tooling, tooling/corona ring, transient recovery voltage capacitor—MS DT (TRV capacitor—MS DT), transient recovery voltage capacitor—MS LT (TRV capacitor—MS LT), transient recovery voltage capacitor—GCB (TRV capacitor—GCB), transient recovery voltage capacitor—GIS (TRV capacitor—GIS), transient recovery voltage capacitor—MV (TRV capacitor—MV)), communication and monitoring functions (e.g., coupling capacitor, PD-coupler), laboratory functions (e.g., chassis, coupling and accessories, coupling capacitor, coupling capacitor-$SF_6$, DC capacitor, divider, divider capacitor—impulse, load capacitor, overshoot capacitor, support insulator), power quality functions (e.g., filter AC—MV, grading capacitor—spark gap, shunt capacitor), and/or voltage measurement functions (e.g., divider CVD, divider DC, divider EVT, divider LOM).

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Thus, it is intended that the scope of the invention herein disclosed should not be limited by the particular embodiments described above. For example, although the embodiments described herein may be provided in the context of a high voltage capacitor, it will be understood that the scope of the invention may fall within lower voltage capacitors, or other energy storage devices with stacked electrodes.

The headings provided herein, if any, are for convenience only and do not necessarily affect the scope or meaning of the devices and methods disclosed herein.

What is claimed is:

1. A high voltage capacitor, the capacitor comprising:
a plurality of capacitor units connected in electrical series in a stacked configuration, the plurality of capacitor units comprising at least two adjacent capacitor units; and
only a single insulator element positioned between and separating the two adjacent capacitor units,
wherein the insulator element has a first end and a second opposing end, and wherein the first end has a first thickness and the second opposing end has a second smaller thickness.

2. The capacitor of claim 1, wherein the insulator element has a thickness along a dimension from the first end to the second opposing end which decreases linearly from the first end to the second end.

3. The capacitor of claim 2, wherein a thickness of the insulator element along a dimension perpendicular to the dimension from the first end to the second end remains substantially constant.

4. The capacitor of claim 2, wherein a cross section of the insulator element along a dimension extending from the first end to the second opposing end has a triangle shape.

5. The capacitor of claim 1, wherein the insulator element comprises a first insulator element between a first set of two adjacent capacitor units, further comprising a second insulator element between a second set of two adjacent capacitor units, wherein the second insulator element has a first end and a second opposing end, and wherein the first end of the second insulator element has a first thickness and the second opposing end of the second insulator element has a second smaller thickness, wherein the first and the second insulator elements are positioned in an alternating configuration with respect to each other.

6. The capacitor of claim 1, wherein the second end is proximate to a connection portion between the two adjacent capacitor units, the connection portion connecting the two adjacent capacitor units in electrical series.

7. The capacitor of claim 1, wherein at least one of the adjacent capacitor units comprise a plurality of individual capacitor cells in electrical parallel.

8. The capacitor of claim 1, wherein the insulator element comprises polypropylene.

9. The capacitor of claim 1, wherein the thickness of the first end of the insulator element is 1 mm to 3 mm, and wherein the thickness of the second end is less than 0.01 mm.

10. The capacitor of claim 1, wherein the high voltage capacitor is configured for providing a nominal operating voltage of about 1 kilovolts (kV) to about 600 kV.

11. The capacitor of claim 1, wherein the plurality of capacitor units comprises 2 to 1,000 capacitor units.

12. The high voltage capacitor of claim 1, wherein the insulator element comprises a plurality of protrusions extending from one or more edges of the insulator element, the protrusions configured for stabilization of the two adjacent capacitor units.

13. The high voltage capacitor of claim 12, wherein each protrusion in the plurality of protrusions extends from a corresponding corner of the insulator element.

14. The high voltage capacitor of claim 13, wherein each protrusion comprises a substantially rectangular shape.

15. An insulator element, comprising:
a first end having a first thickness and an opposing second end having a second thinner thickness,
wherein the insulator element comprises a plurality of protrusions extending from one or more edges of the insulator element, the protrusions configured for placement between and stabilization of two adjacent capacitor units of a high voltage capacitor.

16. The insulator element of claim 15, wherein the insulator element has a thickness along a dimension from the first end to the second opposing end which decreases substantially linearly from the first end to the second end.

17. The insulator element of claim 16, wherein a thickness of the insulator element along a dimension perpendicular to the dimension from the first end to the second opposing end remains substantially constant.

18. A high voltage capacitor comprising a plurality of the insulator elements of claim 16, wherein the high voltage capacitor is configured for providing a nominal operating voltage of 10 kilovolts (kV) to 420 kV.

19. The insulator element of claim 15, wherein a cross section of the insulator element along a dimension from the first end to the second opposing end has a triangle shape.

20. A capacitor comprising two adjacent capacitor units and the insulator element of claim 15, wherein the first end is proximate to a connection portion between the two adjacent capacitor units, the connection portion connecting the two adjacent capacitor units in electrical series.

21. The insulator element of claim 15, wherein the first end has a thickness of 1 mm to 3 mm.

22. The insulator element of claim 15, wherein each protrusion in the plurality of protrusions extends from a corresponding corner of the insulator element.

23. The insulator element of claim 22, wherein each protrusion comprises a substantially rectangular shape.

* * * * *